US009992230B1

(12) United States Patent
Haverty et al.

(10) Patent No.: US 9,992,230 B1
(45) Date of Patent: Jun. 5, 2018

(54) ASSESSING SECURITY CONTROL QUALITY AND STATE IN AN INFORMATION TECHNOLOGY INFRASTRUCTURE

(71) Applicant: Tripwire, Inc., Portland, OR (US)

(72) Inventors: Marsha Haverty, Portland, OR (US); Ted Schuh, Happy Valley, OR (US)

(73) Assignee: Tripwire, Inc., Portland, OR (US)

( * ) Notice: Subject to any disclaimer, the term of this patent is extended or adjusted under 35 U.S.C. 154(b) by 44 days.

(21) Appl. No.: 14/500,718

(22) Filed: Sep. 29, 2014

Related U.S. Application Data

(60) Provisional application No. 61/883,947, filed on Sep. 27, 2013, provisional application No. 61/907,767, filed on Nov. 22, 2013.

(51) Int. Cl.
*H04L 29/06* (2006.01)

(52) U.S. Cl.
CPC .......... *H04L 63/20* (2013.01); *H04L 63/1433* (2013.01)

(58) Field of Classification Search
CPC ..................... H04L 63/20; H04L 63/1433
See application file for complete search history.

(56) References Cited

U.S. PATENT DOCUMENTS

| | | | | |
|---|---|---|---|---|
| 6,070,244 A * | 5/2000 | Orchier | ............... | G06F 21/6218 709/223 |
| 6,326,962 B1 * | 12/2001 | Szabo | ................... | G06F 9/4443 707/E17.082 |
| 7,376,722 B1 * | 5/2008 | Sim | ........................ | H04H 60/31 709/223 |
| 8,402,546 B2 * | 3/2013 | Greenshpon | .......... | G06F 21/577 706/52 |
| 8,736,299 B1 * | 5/2014 | Pedersen | .......... | H03K 19/17768 326/38 |
| 8,762,298 B1 * | 6/2014 | Ranjan | ...................... | G06N 5/02 706/12 |
| 9,311,386 B1 * | 4/2016 | Song | ................. | G06F 17/30722 |
| 2003/0130995 A1 * | 7/2003 | Pope | ................. | G06F 17/30286 |
| 2004/0093408 A1 * | 5/2004 | Hirani | ..................... | H04L 41/12 709/224 |
| 2005/0104885 A1 * | 5/2005 | Jager | ....................... | G06T 11/20 345/440 |
| 2005/0110639 A1 * | 5/2005 | Puzio | ..................... | G08B 13/14 340/572.1 |

(Continued)

*Primary Examiner* — Hadi S Armouche
*Assistant Examiner* — Sher A Khan
(74) *Attorney, Agent, or Firm* — Klarquist Sparkman, LLP

(57) ABSTRACT

Disclosed herein are representative embodiments of methods, apparatus, and systems for processing and managing information from one or more security control tools, such as a security configuration management tool, a vulnerability management tool, an event logging tool, or other IT infrastructure security or monitoring tool that is used to monitor, secure, and/or control assets in an IT infrastructure. For example, in some embodiments, user interfaces are disclosed that allow a user to quickly view, filter, and evaluate the degree of security control coverage in selected assets of an enterprise. In further embodiments, user interfaces are disclosed that allow a user to view and evaluate the current security state for selected assets in across a variety of categories and, in some cases, as guided by a two-dimensional vulnerability risk matrix.

16 Claims, 16 Drawing Sheets

(56) References Cited

U.S. PATENT DOCUMENTS

| | | | |
|---|---|---|---|
| 2008/0177598 A1* | 7/2008 | Davie | G06Q 10/06 705/308 |
| 2008/0183687 A1* | 7/2008 | Law | G06F 17/30389 |
| 2010/0067390 A1* | 3/2010 | Pereira Valente | G06F 21/554 370/252 |
| 2010/0265061 A1* | 10/2010 | Harmon | G08B 21/24 340/539.13 |
| 2010/0309149 A1* | 12/2010 | Blumenberg | G06F 3/04883 345/173 |
| 2012/0191831 A1* | 7/2012 | Kanzabedian | H04L 41/0853 709/223 |
| 2012/0221553 A1* | 8/2012 | Wittmer | G06F 17/30572 707/722 |
| 2013/0097528 A1* | 4/2013 | Armitage | G06Q 10/103 715/753 |
| 2013/0212117 A1* | 8/2013 | Tyree | G06F 17/30876 707/756 |
| 2013/0263280 A1* | 10/2013 | Cote | G06F 21/62 726/26 |
| 2013/0275574 A1* | 10/2013 | Hugard, IV | H04L 63/10 709/224 |
| 2014/0173739 A1* | 6/2014 | Ahuja | G06F 21/577 726/25 |
| 2014/0351940 A1* | 11/2014 | Loder | H04L 63/1433 726/25 |
| 2015/0040051 A1* | 2/2015 | Fuhrmann, Jr. | G06F 3/0481 715/771 |

* cited by examiner

ASSESSING SECURITY CONTROL QUALITY AND STATE IN AN INFORMATION TECHNOLOGY INFRASTRUCTURE

CROSS REFERENCE TO RELATED APPLICATIONS

This application claims the benefit of U.S. Provisional Application No. 61/883,947 entitled "ATTACK SURFACE ANALYTICS" and filed on Sep. 27, 2013, and the benefit of U.S. Provisional Application No. 61/907,767 entitled "ATTACK SURFACE ANALYTICS" and filed on Nov. 22, 2013, both of which are hereby incorporated herein by reference.

FIELD

This application relates generally to the field of managing and monitoring an information technology ("IT") infrastructure.

SUMMARY

Disclosed below are representative embodiments of methods, apparatus, and systems for processing and managing information from one or more security control tools, such as one or more of a security configuration management tool, a vulnerability management tool, an event logging tool, or other IT infrastructure security or monitoring tool that is used to monitor, secure, and/or control assets in an IT infrastructure. For example, in some embodiments, user interfaces are disclosed that allow a user to quickly view, filter, and evaluate the degree or quality of security control coverage in selected assets in an enterprise's IT infrastructure. In further embodiments, user interfaces are disclosed that allow a user to view and evaluate the current security state for selected assets across a variety of categories and, in some cases, as guided by a two-dimensional vulnerability risk matrix. The disclosed methods, apparatus, and systems should not be construed as limiting in any way. Instead, the present disclosure is directed toward all novel and/or non-obvious features and aspects of the various disclosed embodiments, alone or in various combinations and sub-combinations with one another.

DETAILED DESCRIPTION

I. General Considerations

Figure 1:
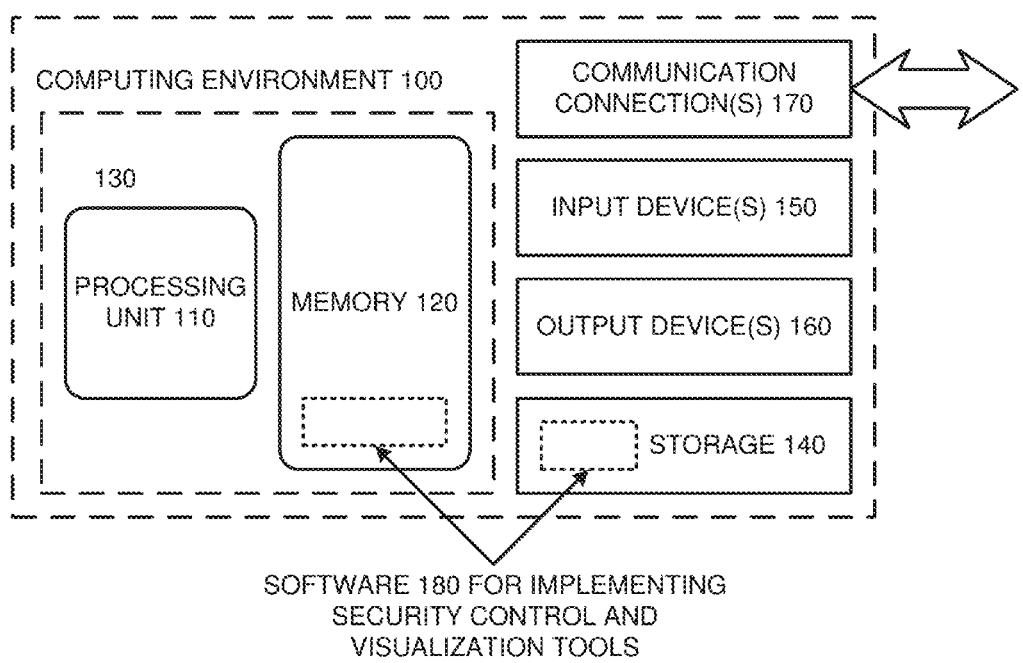
FIG. 1 is a block diagram illustrating a computing environment in which aspects of the disclosed technology can be performed.

Disclosed below are representative embodiments of methods, apparatus, and systems for processing and managing information from one or more security control tools, such as a security configuration management tool (also referred to as a compliance and configuration control ("CCC") tool), a vulnerability management tool, an event logging tool, or other IT infrastructure security or monitoring tool that is used to monitor, secure, and/or control assets in an IT infrastructure. For example, in some embodiments, user interfaces are disclosed that allow a user to quickly view, filter, and evaluate the degree or quality of security control coverage in selected assets of an enterprise. In further embodiments, user interfaces are disclosed that allow a user to view and evaluate the current security state for selected assets in across a variety of categories and, in some cases, as guided by a two-dimensional vulnerability risk matrix.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "compare" to describe the disclosed methods. These terms may be high-level abstractions of the actual operations that are performed. The actual operations that correspond to these terms may vary depending on the particular implementation and are readily discernible by one of ordinary skill in the art. Additionally, as used herein, the term "and/or" means any one item or combination of items in the phrase.

II. Example Computing Environments for Implementing Embodiments of the Disclosed Technology Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including desktop computers, servers, smart phones, tablet computers, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")). The integrated circuit can be embedded in or directly coupled to an electrical device having a suitable display device.

FIG. 1 illustrates a generalized example of suitable computing hardware 100 with which several of the described embodiments can be implemented. The computing hardware 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing hardware 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 for implementing one or more of the described embodiments. For example, the memory 120 can store software 180 for implementing any of the disclosed techniques described herein and their accompanying user interfaces.

The computing environment can have additional features. For example, the computing hardware 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other such tangible non-transitory non-volatile memory or storage medium which can be used to store information and which can be accessed within the computing environment 100. The storage 140 can also store instructions for the software 180 implementing any of the described techniques, systems, or environments.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, smartphone display, tablet display, netbook display, or touchscreen), printer, speaker, CD-writer, or another device that provides output from the computing environment 100. Any of the disclosed user interfaces can be displayed on such display devices as part of an implementation of the disclosed technology.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 100, computer-readable media include tangible non-transitory computer-readable media such as memory 120 and storage 140 but do not encompass transitory signals or carrier waves per se.

The various methods disclosed herein can also be described in the general context of computer-executable instructions, such as those included in program modules, being executed in a computing environment by a processor. Generally, program modules include routines, programs, libraries, objects, classes, components, data structures, and so on that perform particular tasks or implement particular abstract data types. The functionality of the program modules may be combined or split between program modules as desired in various embodiments. Computer-executable instructions for program modules may be executed within a local or distributed computing environment.

Figure 2:
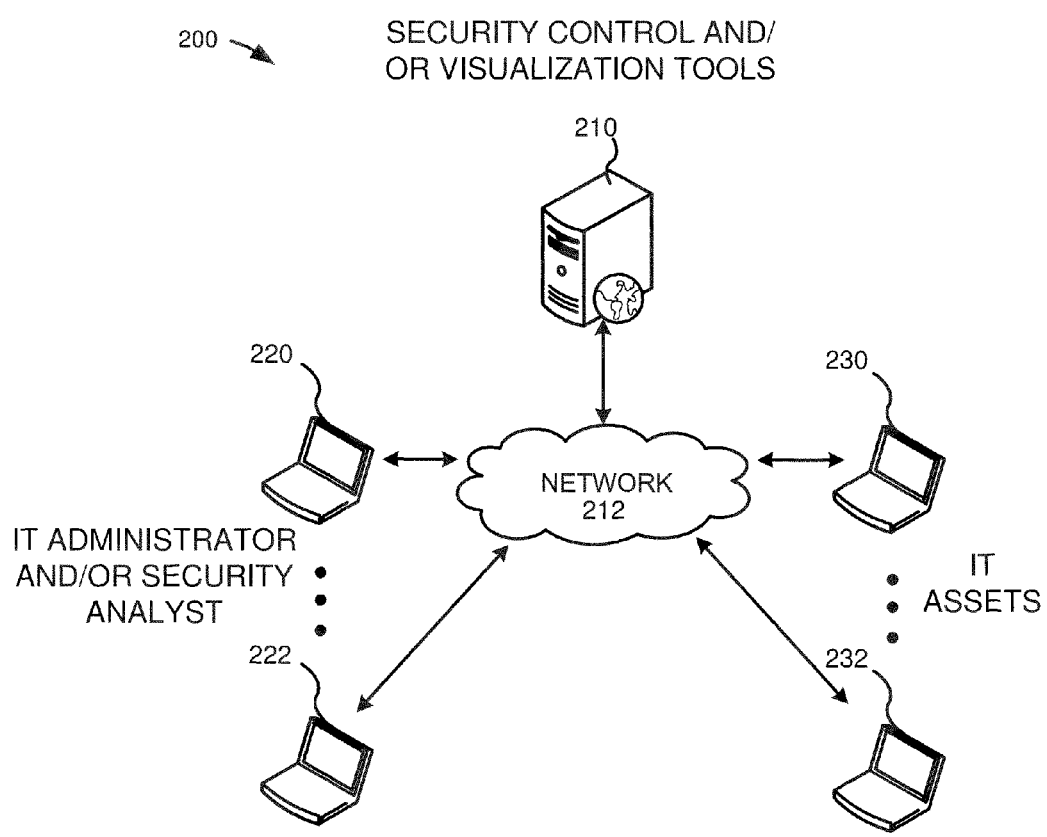
FIG. 2 is a block diagram showing a first exemplary network environment in which aspects of the disclosed technology can be performed.

An example of a possible network topology (e.g., a client-server network or cloud-based network) for implementing a system according to the disclosed technology is depicted in FIG. 2. Networked computing devices 220, 222, 230, 232 can be, for example, computers running a browser, plug-in, or other software that communicates with one or more central computers 210 (e.g., one or more servers in a cloud computing environment) via network 212. The computing devices 220, 222, 230, 232 and the central computer 210 can have computer architectures as shown in FIG. 1 and discussed above. The computing devices 220, 222, 230, 232 are not limited to traditional personal computers but can comprise other computing hardware configured to connect to and communicate with a network 212 (e.g., smart phones, tablets, or other mobile computing devices, servers, network devices, dedicated devices, and the like).

In the illustrated embodiment, the computing devices 220, 222, 230, 232 are configured to communicate with one or more central computers 210 via a network 212 (e.g., using a cloud network or other client-server network). In certain implementations, the central computers 210 execute software for performing any of the disclosed security control and/or visualization functionalities (e.g., display functionalities, trending functionalities, and/or attack surface index functionalities) or software for computing any one or more of the intermediate or final values associated with the disclosed embodiments. The central computers 210 can transmit data to any of the computing devices 220, 222 (e.g., data for attack surface index displays, reports, or user interfaces; data for trend displays, reports, or user interfaces; data for any of the displays, reports, or user interfaces shown herein are disclosed in U.S. Provisional Application No. 61/883,947 entitled "ATTACK SURFACE ANALYTICS" and filed on Sep. 27, 2013, and U.S. Provisional Application No. 61/907,767 entitled "ATTACK SURFACE ANALYTICS" and filed on Nov. 22, 2013, both of which are hereby incorporated herein by reference; or any other data to be processed or displayed on a graphical user interface or web page at the computing devices 220, 222). For example, the computing devices 220, 222 (e.g., computing devices associated with an IT administrator, security analyst, or Chief Information Security Officer (CISO)) can receive data from the central computer 210 over the network 212. In order to provide the data, the one or more central computers 210 can receive and process data from the computing devices 230, 232 (e.g., computing devices or other devices associated with assets or nodes in the IT infrastructure administered by the IT administrator, security analyst, or CISO), which can store and/or transmit various types of configuration data and security data used by the IT administrator, security analyst, or CISO. For example, the computing devices 230, 232 may store device configuration data, compliance policy data, change data, security data, logging event data, vulnerability assessment data, and/or other such data used by an IT compliance and configuration control tool (e.g., via a software agent). Alternatively, the one or more central computers 210 may themselves store the device configuration data, compliance policy, security, logging event, vulnerability assessment, and other such IT data.

Figure 3:
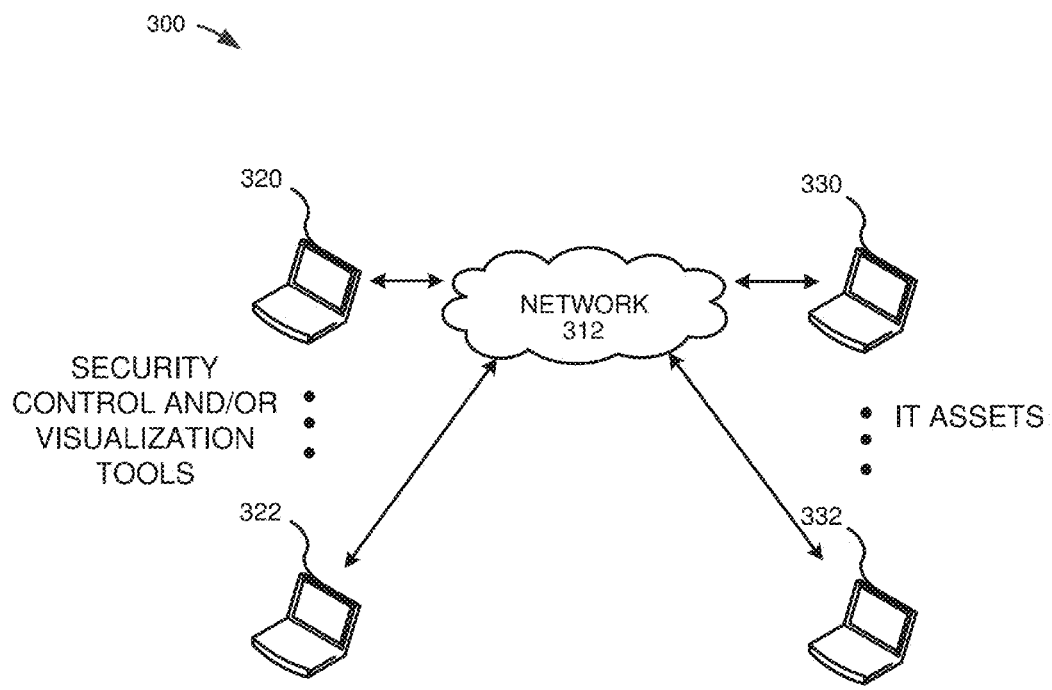
FIG. 3 is a block diagram showing a second exemplary network environment in which aspects of the disclosed technology can be performed.

Another example of a possible network topology for implementing a system according to the disclosed technology is depicted in FIG. 3. Networked computing devices 320, 322, 330, 332 can be, for example, computers running a browser or other software connected to a network 312. As above, the computing devices 320, 322, 330, 332 can have computer architectures as shown in FIG. 1 and discussed above. The computing devices 320, 322, 330, 332 are not limited to traditional personal computers but can comprise other computing hardware configured to connect to and communicate with a network 312 (e.g., smart phones, tablets, or other mobile computing devices, servers, network devices, dedicated devices, and the like).

In the illustrated embodiment, the computing devices 320, 322 are configured to communicate directly with computing devices 330, 332 via the network 312. In the illustrated embodiment, the computing devices 320, 322 execute software for implementing any of the disclosed security control and/or visualization functionalities (e.g., display functionalities, trending functionalities, and/or attack surface index functionalities) or software for computing any one or more of the intermediate or final values associated with the disclosed embodiments. The computing devices 320, 322 can use data obtained from the computing devices 330, 332 via the network 312. Any of the data received from the devices 330, 332, can be stored or displayed on any of the computing devices 320, 322 (e.g., displayed as data on a graphical user interface or web page at the computing devices 320, 322).

In the illustrated embodiments, the illustrated networks 212, 312 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the networks 212, 312 can be the Internet or a similar public network and operate using an appropriate protocol (e.g., the HTTP protocol).

III. Example Embodiments of the Disclosed Technology

Disclosed herein are representative embodiments of methods, apparatus, and systems for processing and managing information from one or more security control tools, such as one or more of a security configuration management tool (e.g., sometimes referred to as a compliance and configuration control ("CCC") tool), a vulnerability management tool, an event logging tool, or other IT infrastructure security or monitoring tool that is used to monitor, secure, and/or control assets in an IT infrastructure. Further, in particular embodiments discussed below, one or more user interfaces are provided for computing and displaying information related to the security and status of one or more sets of one or more of the assets in the IT infrastructure.

The disclosed technology can be used as part of (or in connection with) an IT management infrastructure for managing and monitoring one or more IT assets. In this disclosure, assets are also referred to as "nodes" or "devices". The IT nodes (assets or devices) can comprise, for example, servers, desktops, directory servers, hypervisors, databases, middleware applications, network devices, virtual infrastuctures, and/or other such assets. In particular embodiments, the IT management infrastructure comprises one or more security control tools, including one or more of a security configuration management tool, a vulnerability management tool, or an event logging tool (which can be implemented separately from one another, as part of a single management platform, or any combination thereof).

In general, a security configuration management ("SCM") tool can be used to detect, analyze, and report on change activity in an IT infrastructure. For example, the SCM tool can assess or receive configurations of the one or more nodes at one or more locations and detect and report changes to the configurations. Further, as part of its secure configuration monitoring functionality (also referred to as just configuration monitoring) and for one or more of the monitored nodes, the SCM tool can compare an expected configuration value for a node to a stored security policy. For example, the SCM tool can determine whether the nodes comply with internal and/or external policies (e.g., government, regulatory, or third-party standards, such as Sarbanes-Oxley, HIPAA, ISO 27001, NIST 800, NERC, PCI, PCI-DSS, Basel II, Bill 198, CIS, DISA, FDCC, FFIEC, GCSx, GLBA, GPG 13, IBTRM, or other IT infrastructure compliance standards). The SCM tool can identify and validate changes to ensure these configurations remain in known and trusted states.

In particular implementations, the SCM tool also performs a change auditing functionality in which configuration changes from a previously stored baseline are detected. For example, the SCM tool can discover and profile assets, then capture a baseline of server file systems, desktop file system, directory servers, databases, virtual systems, middleware applications and/or network device configurations in a known good state. Ongoing integrity checks then compare the current states against these baselines to detect changes. The SCM tool collects information used to reconcile detected changes, ensuring they are authorized and intended changes. The SCM tool can crosscheck detected changes with defined IT compliance policies (e.g., using policy-based filtering), with documented change tickets in a change control management ("CCM") system, with a list of approved changes, with automatically generated lists created by patch management and software provisioning tools, and/or against other desired and approved changes. This allows the SCM tool to automatically recognize desired changes and expose undesired changes. These detection and cross-checking functions are part of the SCM tool's security configuration monitoring function.

The SCM tool can also generate one or more reports concerning the monitored nodes showing a wide variety of information (e.g., compliance information, configuration information, usage information, etc.) The compliance-related reports generated by the SCM tool can, in some instances, comprise a score for a node that indicates the relative compliance status of the node as a numerical value in a range of possible values (e.g., a score of 1 to 100 or other such numeric or alphabetical range). The SCM tool can also apply a set of one or more tests to the nodes to evaluate the compliance status of one or more nodes. In such embodiments, the compliance-related reports generated by the SCM tool can include the number of devices that passed a particular test as well as the number of devices that failed the test.

Still further, the SCM tool can be configured to provide an audit reporting function in which an audit trail of configuration control activities is maintained for one or more selected assets, thereby simplifying any requirement to prove compliance. Further, the auditing can be performed at frequent intervals (e.g., daily or multiple times in a day, which is sometimes referred to herein as "real time") for the selected assets.

An exemplary SCM tool that is suitable for use as a security configuration management tool with the disclosed technology is the Tripwire® Enterprise tool available from Tripwire, Inc. The examples described below are sometimes shown or discussed as being used in connection with the Tripwire Enterprise tool. This particular usage should not be construed as limiting, however, as the disclosed technology can be adapted by those skilled in the art to help monitor and manage IT nodes using other compliance and configuration control tools as well.

As noted, the SCM tool may be used with one or more other software tools (e.g., as part of a bigger asset management platform), such as an event logging tool and/or a vulnerability management tool. One such platform having multiple software tools that is suitable for use with or adaptation to implement embodiments of the disclosed technology is the Tripwire® VIA platform.

An event logging tool can be used to monitor and store detected change event data in an event log and/or transmit the event data as soon as it is detected or shortly after it is detected. Event logs typically comprise a list of activities and configuration changes at nodes of the IT network. One such event logging and management tool that is suitable for use with or adaptation to implement embodiments of the disclosed technology is the Tripwire® Log Center tool available from Tripwire, Inc. This particular usage should not be construed as limiting, however, as the disclosed technology can be used with other event logging tools for an IT environment.

A vulnerability management tool (also referred to as a vulnerability assessment tool) is typically configured to detect, analyze, and report on one or more security control issues for one or more of the assets. Further, the vulnerability management tool can measure and help manage security risks to the assets. The vulnerability management tool can itself perform an operation whereby networked assets are discovered and profiled (separate from the SCM tool). For instance, the vulnerability management tool can profile networked hosts, applications, services, vulnerabilities, and configurations in order to provide a risk management view of the assets separate from the SCM tool. The vulnerability management tool can also be configured to perform vulnerability scanning operations on internal networks and/or vulnerability scanning on outward-facing networks, such as scanning for web application vulnerabilities. As noted, example vulnerability management tools that are suitable for use with or adaptation to implement embodiments of the disclosed technology are the Tripwire® IP360 or Tripwire® WebApp360 vulnerability management tools available from Tripwire, Inc. The examples described below are sometimes shown as being used in connection with the Tripwire IP360 tool. This particular usage should not be construed as limiting, however, as the disclosed technology can be used with other vulnerability management tools for an IT environment.

Each of these example security control tools can provide one or more functions related to the security control of assets in an IT environment. Accordingly, such functions are sometimes referred to as "security controls". Further, it should be understand that a given security control tool may provide one or multiple security controls for one or more assets in the IT infrastructure. For example, the SCM tool can provide a configuration monitoring security control (as discussed above) as well as a change auditing security control (also discussed above), while the vulnerability management tool can provide a vulnerability assessment security control (as discussed), and the event logging tool can provide an event logging security control (as also discussed above).

The asset data from one or more of the security control tools (e.g., from one or more of a security configuration management tool e.g., a vulnerability management tool, an event logging tool, or other IT infrastructure security or monitoring tool) can be accessed, reconciled, processed, and/or displayed (e.g., on a suitable display device) by a reporting (or visualization) tool that provides the user (e.g., a security analyst) with information regarding the monitored assets. For instance, the reporting (or visualization) tool can provide a user with one or more graphic user interfaces that display information collected from multiple individual security control tools in a single interface, thereby allowing the user to ascertain from a single screen information that would otherwise require separate access and report viewing from the individual tools. Further, because the data from each of the tools may be voluminous and contain additional information that is not necessary for the user to understand the current security state of the IT assets in his or her enterprise, certain graphic user interfaces disclosed herein display information from the various tools in a highly focused, yet dynamic and flexible, manner. Such interfaces can be important to an organization's IT professionals, including, for example, the organization's security analyst, who is desirably informed of important or critical security issues or changes to the security state as quickly and effectively as possible, regardless of what security control is responsible is responsible for detecting such issues or changes.

Figure 4:
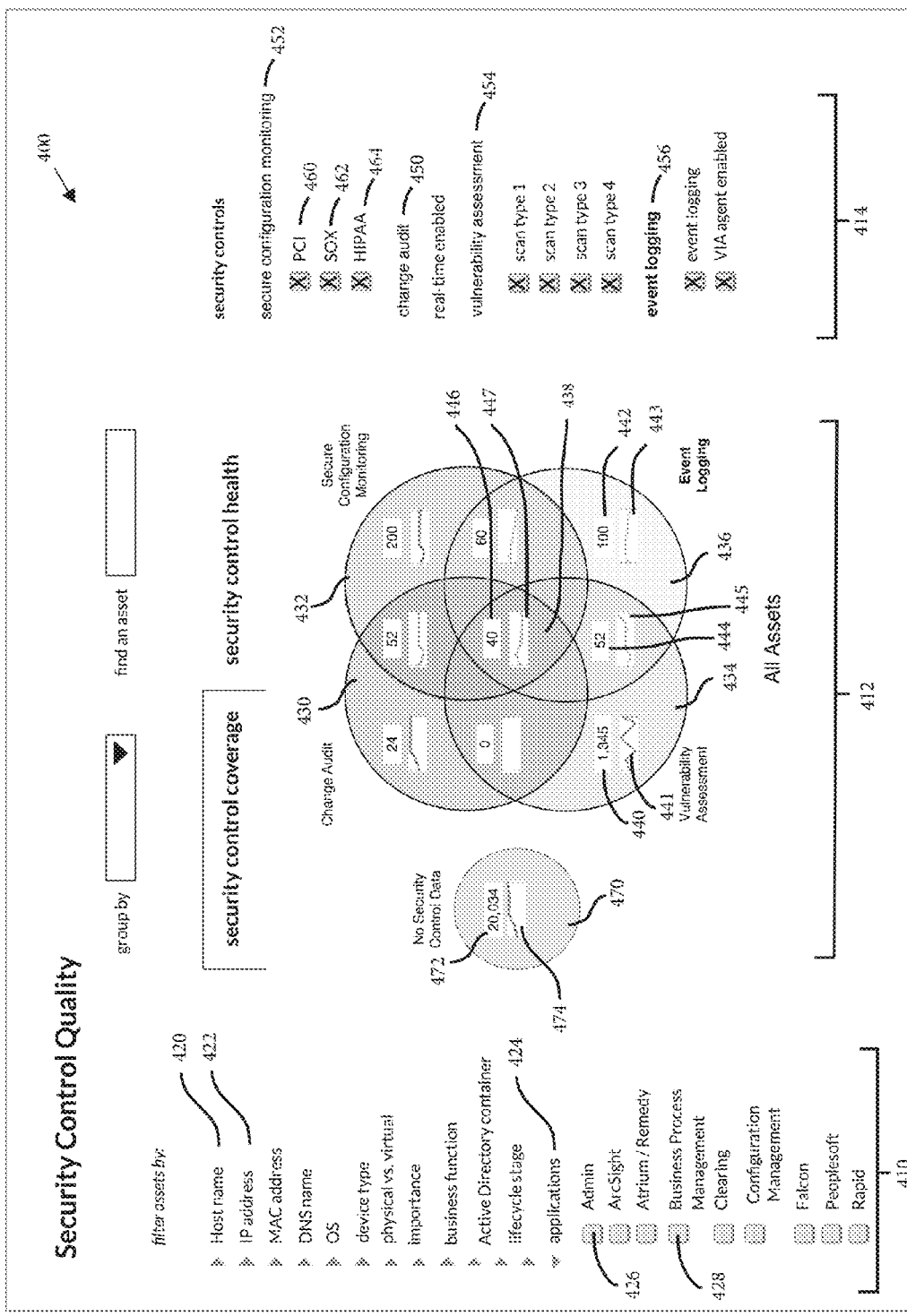
FIG. 4 is a screen shot of a first user interface for displaying information related to the security and status of one or more of the assets in the IT infrastructure.

FIG. 4 is an example screen shot of a user interface 400 for displaying information related to the security and status of one or more of the assets in an IT infrastructure. The example interface 400 is generally divided into three sections: an asset attribute filtering area 410, a multi-security-control reporting area 412, and a security control filtering area 414.

In the asset attribute filtering area 410, one or more categories of attributes of the assets discovered by one or more monitoring and security tools (as discussed above) are displayed (such as categories 420, 422, 424). In some implementations, one or more of the categories of attributes can be expanded by having a user click on (or otherwise select) a category, thereby expanding the category to show its individual attributes. This is shown in FIG. 4, for example, by category 424 for "applications", which is expanded to show the various available applications within the category and which can be individually selected as a mechanism for filtering (e.g., by selecting one or more of the boxes next to each individual application (such as boxes 426, 428). Other suitable visualization techniques can also be used to present the various options to a user (e.g., drop down menus, etc.)

In general, the asset attribute filtering area 410 serves as a mechanism for the user to filter the results being shown in the multi-security-control reporting area 412. In certain implementations, the default setting for the asset attribute filtering area 410 is to have all assets selected (no particular filter selected), thus giving a global visualization of the state of security control across the discovered assets. In other embodiments, only pre-selected attributes (e.g., selected by the user during configuration of the visualization tool or otherwise stored as the default setting) are selected by default and used to guide the results in the multi-security-control reporting area 412. By individually selecting one or more of the attributes in one or more of the categories of attributes, the user can "drill-down" or put only selected assets "in scope" for reporting in the multi-security-control reporting area 412.

The multi-security-control reporting area 412 serves as a mechanism to report data from multiple security controls (from one or more security control tools) in a single display area. For instance, in some embodiments, the multi-security-control reporting area 412 shows the number of discovered assets that are being monitored as well as not being monitored by two or more of the security controls. Thus, the multi-security-control reporting area 412 serves as a security control coverage view that allows users to spot gaps in security coverage—assets that should be monitored by a particular security control, but are not. For example, in particular implementations, the multi-security-control reporting area 412 provides security coverage data from individual security control tools as well as security coverage data about the intersections between the security control tools (e.g., results from all available intersections between the security control tools). The particular visual mechanism for displaying this information may vary, but in the illustrated embodiment is a display of overlapping visual representations 430, 432, 434, 436, where each of the overlapping visual representations represents a security control. Further, in the illustrated embodiments, the overlapping representations include at least a portion 438 where all of the visual representations 430, 432, 434, 436 overlap. Further, in the illustrated embodiment, the visual representations 430, 432, 434, 436 are shown as circles, but other geometric representations can be used instead (e.g., ovals, squares, or other polygons).

The multi-security-control reporting area 412 can be used to display a variety of data related to the various security controls represented by the overlapping visual representations 430, 432, 434, 436. In the illustrated embodiment, the multi-security-control reporting area 412 is used to show the number of the selected assets (as selected in the asset attribute filtering area 410) that are monitored or controlled by the security control represented by the respective visual representation 430, 432, 434, 436 and that have the selected security control characteristics (as selected in the security control filtering area 414, discussed below). Further, in the overlapping regions of the representations, 430, 432, 434, 436, the number of assets that are monitored or controlled by the particular combination of security controls represented by the overlap is shown. For example, indicator 440 indicates that, of the selected assets, "1345" are monitored by the vulnerability assessment security control of the vulnerability management tool with the selected security control characteristics; indicator 442 indicates that, of the selected assets, "100" are monitored by the event logging security control of the event logging tool with the selected security control characteristics; indicator 444 indicates that, of the selected assets, "52" are monitored by both the vulnerability assessment security control and the event logging security control with the selected security control characteristics; and indicator 446 indicates that, of the selected assets, "40" are monitored by all of the security controls represented with the selected security control characteristics.

In the illustrated embodiment, the indicators (e.g., indicators 440, 442, 444, 446) are accompanied by associated graphs 441, 443, 445, 447 (sometimes referred to as "sparklines") indicating the historical value of the indicator over a period of time (e.g., a fixed period of time (such as 1 months, 6 months, 1 year, or any other suitable time period or since monitoring with the associated security control began). In particular implementations, the user can select any of the graphs 441, 443, 445, 447 in order to expand the graph and view the changing value in more detail (e.g., with a trace that allows the user to select any particular date and view the associated result).

The visual display shown in FIG. 4 can also be referred to as a Venn diagram display. For instance, the interface 400 displays a Venn diagram where data associated with the interactions (or intersections) between security controls is displayed together with individual data from each individual security control. Further, although only four visual representations are shown in FIG. 4, any number of visual representations (associated with any number of security controls or combination thereof) can be provided in the interface 400 of FIG. 4. Further, although not depicted, some embodiments allow for the user to interact with each segment of the Venn diagram in order to retrieve and view details about the assets in the selected segment. For instance, upon selection, the screen can switch to a different interface showing the asset details (e.g., in a table or other format) or open a window within the screen to show the details.

In the security control filtering area 414, one or more security control characteristics are displayed with their associated security control and made available to the user for further selection or de-selection, thus providing filtering of the data displayed in the multi-security-control reporting area 412 from the security control perspective. In particular, security controls 450, 452, 454, 456, which are associated respectively with representations 430, 432, 434, 436, are displayed along with one or more characteristics or options associated with the security control. The security control options can be displayed as part of a drop down menu or as part of an expandable set (as with area 410) or can be displayed as shown.

In general, the security control characteristics correspond to performance characteristics or options available when using the security control that may not be implemented for every asset being monitored by the security control. Thus, by selecting or de-selecting one or more of the options, the user can further filter the data being displayed in the multi-security-control reporting area 412. As an example, and with respect to the configuration monitoring security control, if the user desires only to view the number of assets that are being checked for compliance with the PCI standard, the user can select only PCI compliance (at 460) and de-select the remaining available compliance standards (SOX at 462 and HIPAA at 464). Thus, the security control filtering area 414 provides a further mechanism for the user to filter the data being shown in the multi-security-control reporting area 412. In certain implementations, the default setting for the security control filtering area 414 is to have all available security control characteristics or options selected. In other embodiments, only pre-selected characteristics (e.g., selected by the user during configuration of the visualization tool or otherwise stored as the default setting) are selected by default and used to guide the data in the multi-security-control reporting area 412. By individually selecting one or more of the security control characteristics or options, the user can "drill-down" or put only assets with certain security control attributes "in scope" for reporting in the multi-security-control reporting area 412.

Also shown in FIG. 4 is a no-security-control representation 470 that is separate from the overlapping visual representations 430, 432, 434, 436 and includes an indicator 472 of the number of assets that have been discovered by the security control tools but that do not have a particular security control associated with it. For instance, many of the assets being represented in the representation 470 are likely discovered through the vulnerability management tool, whose scanning and discovering mechanism often locates various ports and other assets in the IT infrastructure that are not typically controlled by an agent of the SCM tool. The value displayed in indicator 472 of representation 470 can be of particular interest to the user, as it represents potential weaknesses and vulnerabilities in the assets of the IT infrastructure. Further, the value in the representation 470 can be particularly useful when used with the filtering provided by the asset attribute filtering area 410. For example, the asset attribute filtering area 410 can be used to filter the assets to only those deemed by a user to important or critical to security, thus resulting in a value in the representation 470 that represents assets that have a high priority to be actively monitored or controlled by one or more of the available security controls. The no-security-control representation 470 also includes a graph 474 displaying the historical value of the indicator 472 over a period of time and which operates similar to the graphs 441, 443, 445, 447. Further, although not depicted, some embodiments allow for the user to select the no-security-control representation 470 in order to retrieve and view details about the assets that have no security control. For instance, upon selection, the screen can switch to a different interface showing the asset details (e.g., in a table or other format) or open a window within the screen to show the details.

A general example of the disclosed technology as shown in FIG. 4 is a method that comprises: displaying a user interface that indicates the number of assets in an information technology (IT) infrastructure that have been discovered by one or more different security controls tools, wherein the user interface includes at least a first visual representation corresponding to a first security control and a second visual representation corresponding to a second security control, the first visual representation partially overlapping with the second visual representation and thereby forming a non-overlapping portion of the first visual representation, a non-overlapping portion of the second visual representation, and an overlapping portion of both the first visual representation and the second visual representation, and wherein the user interface further displays data in each of the non-overlapping portion of the first visual representation, the non-overlapping portion of the second visual representation, and the overlapping portion of both the first visual representation and the second visual representation, the data in the non-overlapping portion of the first visual representation indicating the number of assets in the IT infrastructure that are being monitored by a first security control, the data in the non-overlapping portion of the second visual representation indicating the number of assets in the IT infrastructure that are being monitored by a second security control, the data in the overlapping portion of both the first visual representation and the second representation indicating the number of assets in the IT infrastructure that are monitored by both the first security control and the second security control, and wherein the user interface further includes a separate visual representation that is separate from the first visual representation and the second visual representation and that displays data indicating the number of assets in the IT infrastructure that have been discovered but that are not currently monitored by any of the first security control or the second security control.

In some embodiments, the user interface further comprises an asset attribute filtering section displaying one or more attributes of the assets in the IT infrastructure that have been discovered by the one or more different security controls tools, and the one or more attributes are selectable and de-selectable by a user to thereby filter the data displayed in the first, second, and separate visual representations to display data only for a selected one or more of the attributes. In certain embodiments, the user interface further comprises a security control filtering section displaying one or more characteristics of the first security control and one or more characteristics of the second security control, and the one or more characteristics of the first and second security controls are selectable and de-selectable by a user to thereby filter the data displayed in the first, second, and separate visual representations to display data only for a selected one or more of the characteristics. In some embodiments, the first visual representation is for one of a vulnerability assessment security control, a policy compliance security control, a change data security control, or a log event data security control, and the second visual representation is for a different security control than the first visual representation and is for one of the vulnerability assessment security control, the policy compliance security control, the change data security control, or the log event data security control. In certain embodiments, the user interface further comprises a third visual representation corresponding to a third security control, and a fourth visual representation corresponding to a fourth security control; and the user interface includes an overlapping portion between all of the first visual representation, the second visual representation, the third visual representation, and the fourth visual representation; and the data in the overlapping portion between all of the first visual representation, the second visual representation, the third visual representation, and the fourth visual representation indicates the number of assets in the IT infrastructure that are being monitored by all of the first security control, the second security control, the third security control, and the fourth security control. Further, in such embodiments, the first visual representation can be for a vulnerability assessment security control, the second visual representation is for a policy compliance security control, the third visual representation is for a change data security control, and the fourth visual representation is for a log event data security control. In some embodiments, the first visual representation and the second visual representation overlapping with the first visual representation are circular visual representations. In certain embodiments, the data in at least one of the non-overlapping portion of the first visual representation, the non-overlapping portion of the second visual representation, or the overlapping portion of both the first visual representation and the second representation includes a graph showing a history of the data in the respective portion over a period of time.

Figure 15:
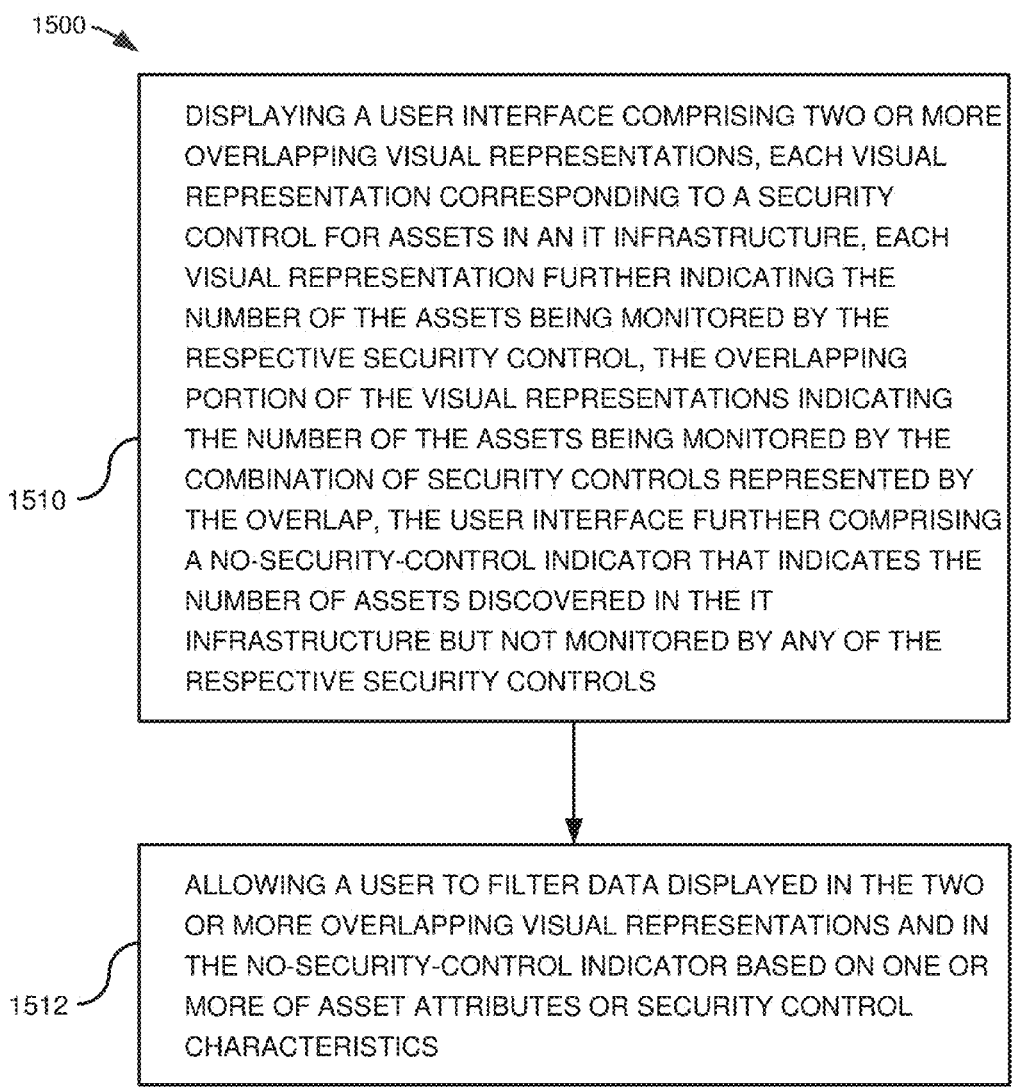
FIG. 15 is a flowchart of an example embodiment of the disclosed technology as illustrated in FIG. 4.

FIG. 15 is a flowchart 1500 of an example embodiment of the disclosed technology as illustrated by FIG. 4 and discussed above. The method shown in FIG. 15 should not be construed as limiting, however, as any one or more of the features and display techniques described can be used in combination with or in place of any of the illustrated features.

At 1510, a user interface is displayed comprising two or more overlapping visual representations, each visual representation corresponding to a security control for assets in an IT infrastructure, each visual representation further indicating the number of the assets being monitored by the respective security control, the overlapping portion of the visual representations indicating the number of the assets being monitored by the combination of security controls represented by the overlap, the user interface further comprising a no-security-control indicator that indicates the number of assets discovered in the IT infrastructure but not monitored by any of the respective security controls.

At 1512 a user is allowed to filter data displayed in the two or more overlapping visual representations and in the no-security-control indicator based on one or more of assets attributes or security control characteristics (e.g., using asset attribute filtering area 410 or security control filtering area 414).

Figure 5:
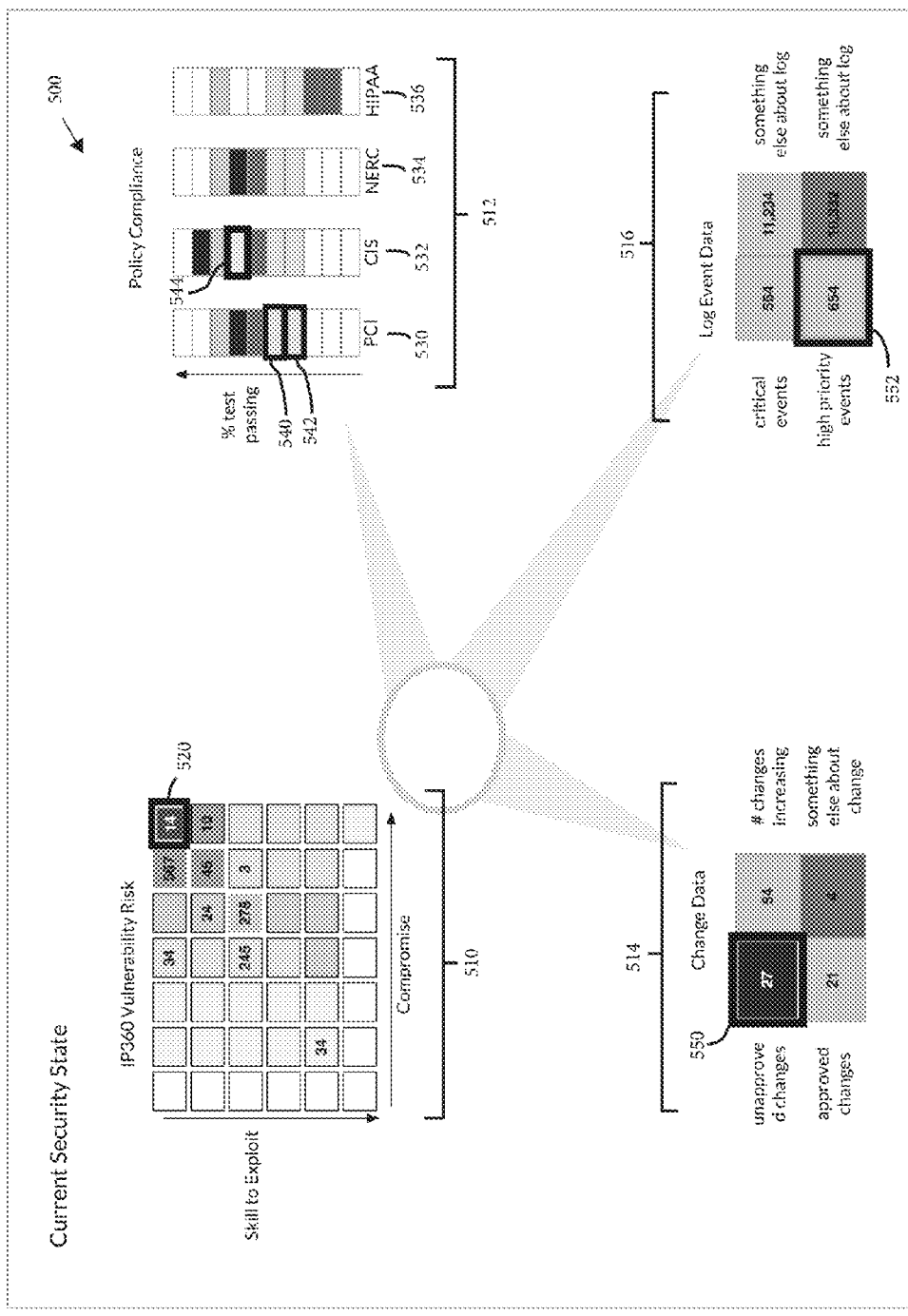
FIG. 5 is a screen shot of a second user interface for displaying information related to the security and status of one or more of the assets in the IT infrastructure.

FIG. 5 is an example screen shot of another user interface 500 for displaying information related to the security control status of one or more of the assets in an IT infrastructure. The example interface 500 is generally divided into four sections: a vulnerability risk matrix area 510, a compliance test passing percentage area 512, a change data evaluation area 514, and a log event data evaluation area 516.

In the vulnerability risk matrix area 510, a two-dimensional vulnerability risk matrix is displayed, along with a two-dimensional array of indicators showing the number of assets that fall within each portion of the array (e.g., where each indicator represents a percentage range along the two axes). In the illustrated embodiment, the two-dimensional array represents assets across two dimensions: a first dimension indicating a degree of compromise that would result from an attack to the asset's vulnerability, and a second dimension indicating the skill required to exploit the vulnerability. As illustrated, then, the assets that have the highest vulnerability risk are shown as belonging to the upper-and-right-most indicator 520. In the illustrated example, the indicator 520 shows a value of "14", indicating that 14 of the monitored and/or controlled assets fall within this category of assets illustrated by the vulnerability risk matrix. The two-dimensional vulnerability risk matrix can be generated, for example, by a suitable vulnerability assessment tool, such as Tripwire® IP360 available from Tripwire, Inc.

As illustrated by the highlighted border around indicator 520, a user can select the indicator (e.g., by hovering to highlight or clicking), and thereby cause data about the selected assets to appear in the other visualization areas 512, 514, 516 (e.g., through additional highlighted borders). (The terms "highlighting", "highlighted", and "highlighted borders" are used herein to refer to a visual mechanism for highlighting particular data. Such highlighting may appear as a border of an indicator changing color and/or brightness; the entirety of the indicator changing color and/or brightness, font changes, size changes, character weight changes; and/or other visual changes or mechanisms for differentiating the data as being prioritized for the user's attention over other data.) Such selection by a user in one visualization area, followed by automatic highlighting (or other demarcation) in the other visualization areas to show corresponding information provides an effective and efficient mechanism for a user to explore aspects of the selected assets that may require immediate or urgent attention.

In the illustrated embodiment, the compliance test passing percentage area 512 shows binning diagrams (e.g., binning diagrams 530, 532, 534, 536) for one or more compliance tests. The binning diagrams display the test results for one or more selected assets, displayed as a percentage of passing criteria for the respective compliance test. In the illustrated embodiment, the binning diagrams are separated into indicators, each representing a particular percentage range. The number of assets falling into each percentage range can be displayed as a color in the indicator (as illustrated, where darker colors represent larger numbers of assets), and/or the number of assets falling into each percentage can be displayed as a number in each respective indicator. Further, in the illustrated embodiment, when the user selects indicator 520 on the vulnerability risk matrix area 510, the compliance test results for the assets associated with the selection are highlighted (or otherwise demarcated) in the compliance test passing percentage area 512 (shown, for instance, as highlighting 540, 542, 544). Thus, the user can quickly see the compliance status (or lack of compliance monitoring, if no highlighting appears) for the selected assets.

The change data evaluation area 514 shows the number of assets associated with one or more categories of change data. For instance, in the illustrated embodiment, the area 514 shows four categories of change data: the number of unapproved changes, the number of approved changes, the number of assets with a rising number of changes, and an unspecified category (which can represent any of a variety of further change data categories). In the illustrated embodiment, the categories are displayed as indicators for each category that together form a four-quadrant box. Although only four categories are shown, any number of change data categories can be displayed in any form of visual representation. The number of assets falling into each change data category can be displayed as a color in the corresponding indicator (as illustrated, where darker colors represent larger numbers of assets), and/or the number of assets falling into each category can be displayed as a number in each respective indicator. Further, in the illustrated embodiment, when the user selects indicator 520 on the vulnerability risk matrix area 510, the corresponding change data category for the assets associated with the selection are highlighted (or otherwise demarcated) in the change data evaluation area 514 (shown, for instance, as highlighting 550). Thus, the user can quickly see the change data status for the selected assets. In certain alternative embodiments, when a user selection is made, the corresponding indicators in the areas 510, 512, 514, 516 can display the number of assets only associated with that selection (as opposed to the total number of assets, as illustrated).

The log event data evaluation area 516 shows the number of assets associated with one or more categories of log events. For instance, in the illustrated embodiment, the area 516 shows four categories of log event data: the number of assets associated with critical events, the number of assets associated with high priority events (which are typically of a lower priority than critical events according to one or more criteria), the number of assets associated with a third event category, and the number of assets associated with a fourth event category (the third and fourth event categories can represent any of a variety of further event categories). In the illustrated embodiment, the categories are displayed as indicators for each category that together form a four-quadrant box. Although only four categories are shown, any number of log event categories can be displayed in any form of visual representation. The number of assets falling into each log event category can be displayed as a color in the corresponding indicator (as illustrated, where darker colors represent larger numbers of assets), and/or the number of assets falling into each category can be displayed as a number in each respective indicator. Further, in the illustrated embodiment, when the user selects indicator 520 on the vulnerability risk matrix area 510, the log event category for the assets associated with the selection are highlighted (or otherwise demarcated) in the log event evaluation area 516 (shown, for instance, as highlighting 552). Thus, the user can quickly see the event status for the selected assets. In certain alternative embodiments, when a user selection is made, the corresponding indicators in the areas 510, 512, 514, 516 can display the number of assets only associated with that selection (as opposed to the total number of assets, as illustrated).

Figure 6:
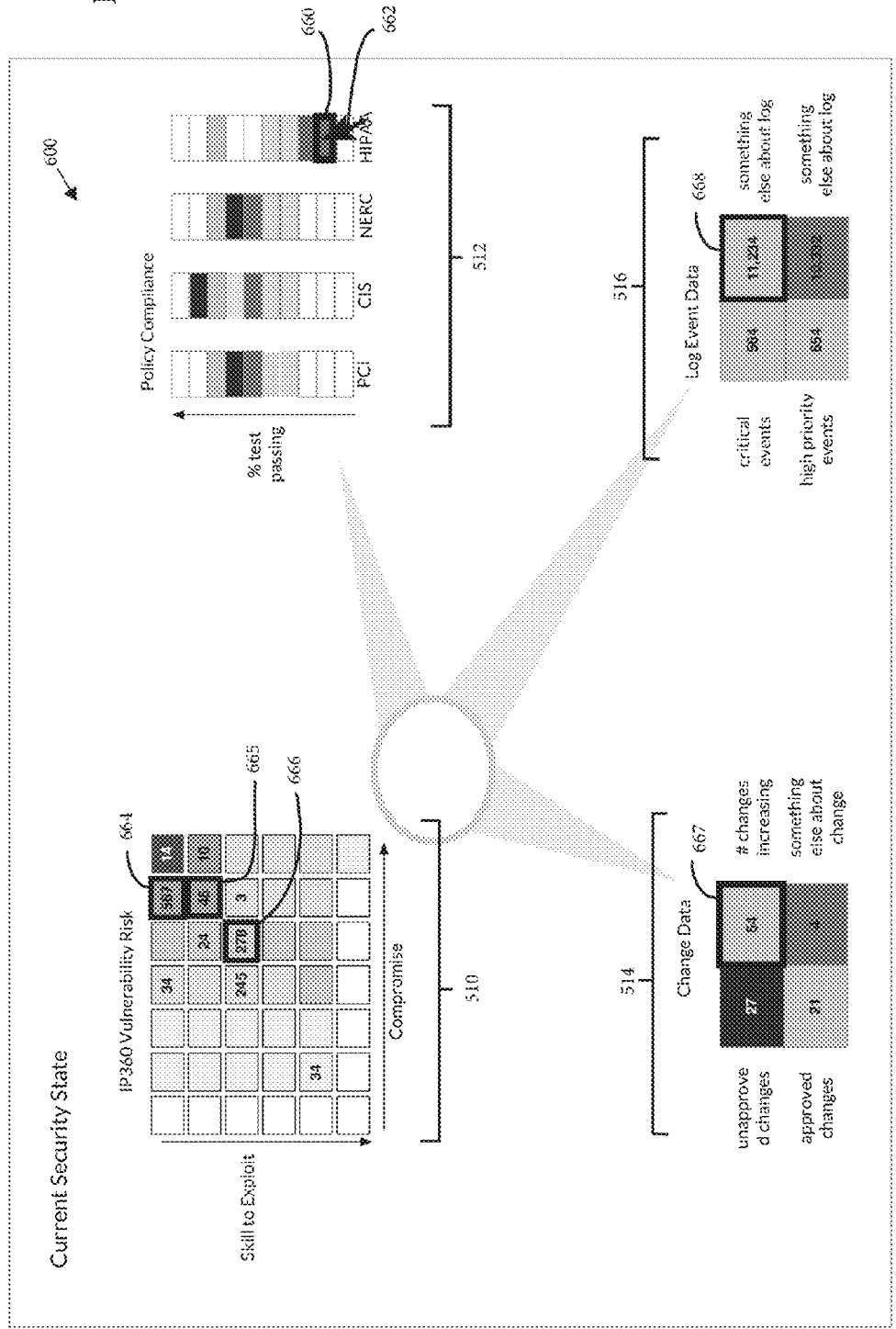
FIG. 6 is a screen shot of the user interface of FIG. 5 illustrating a further selection mechanism.
Figure 7:
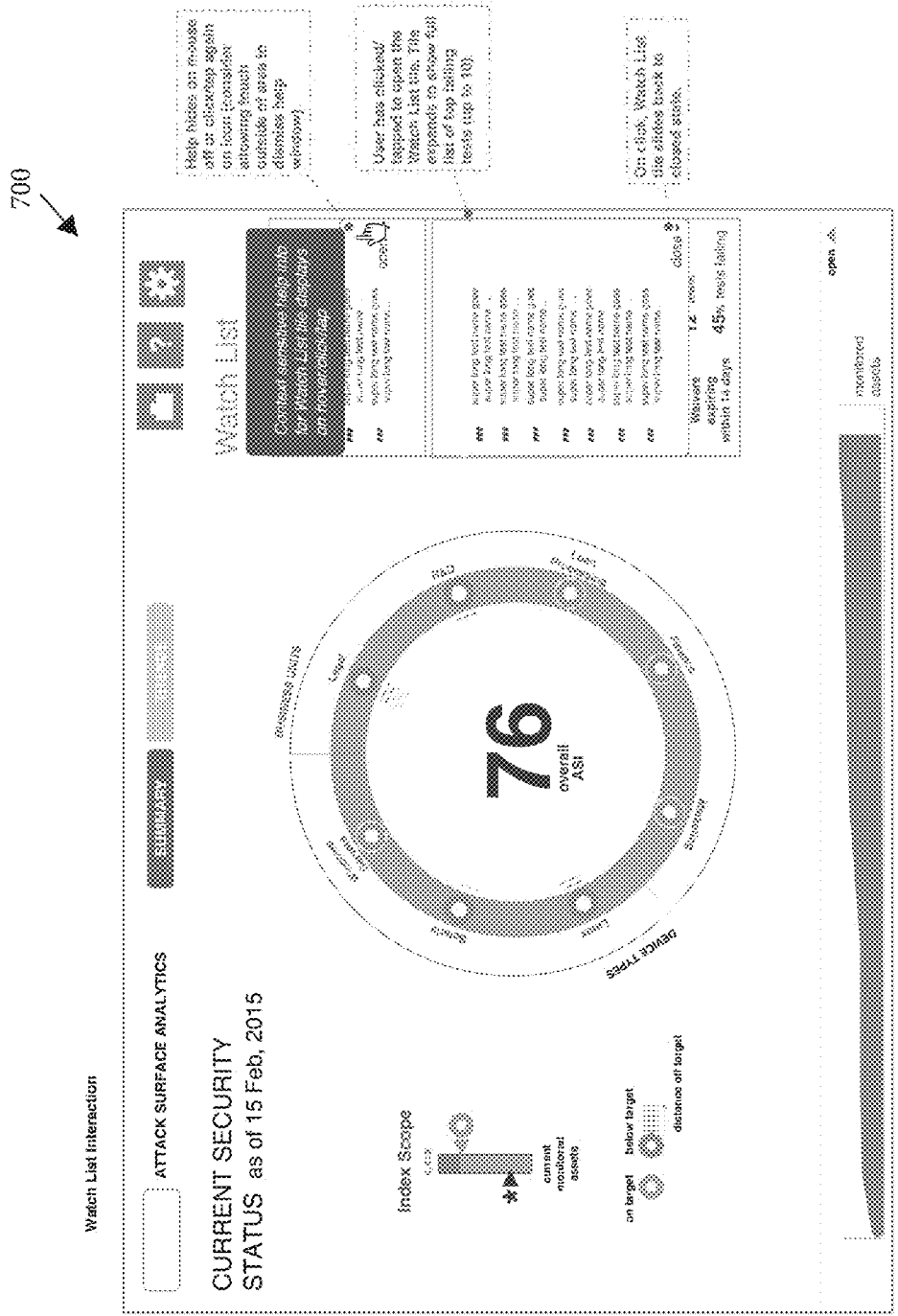
FIGS. 7-14 are a series of example screen shots of additional user interfaces for displaying information related to the security and status of one or more of the assets in the IT infrastructure.
Figure 8:
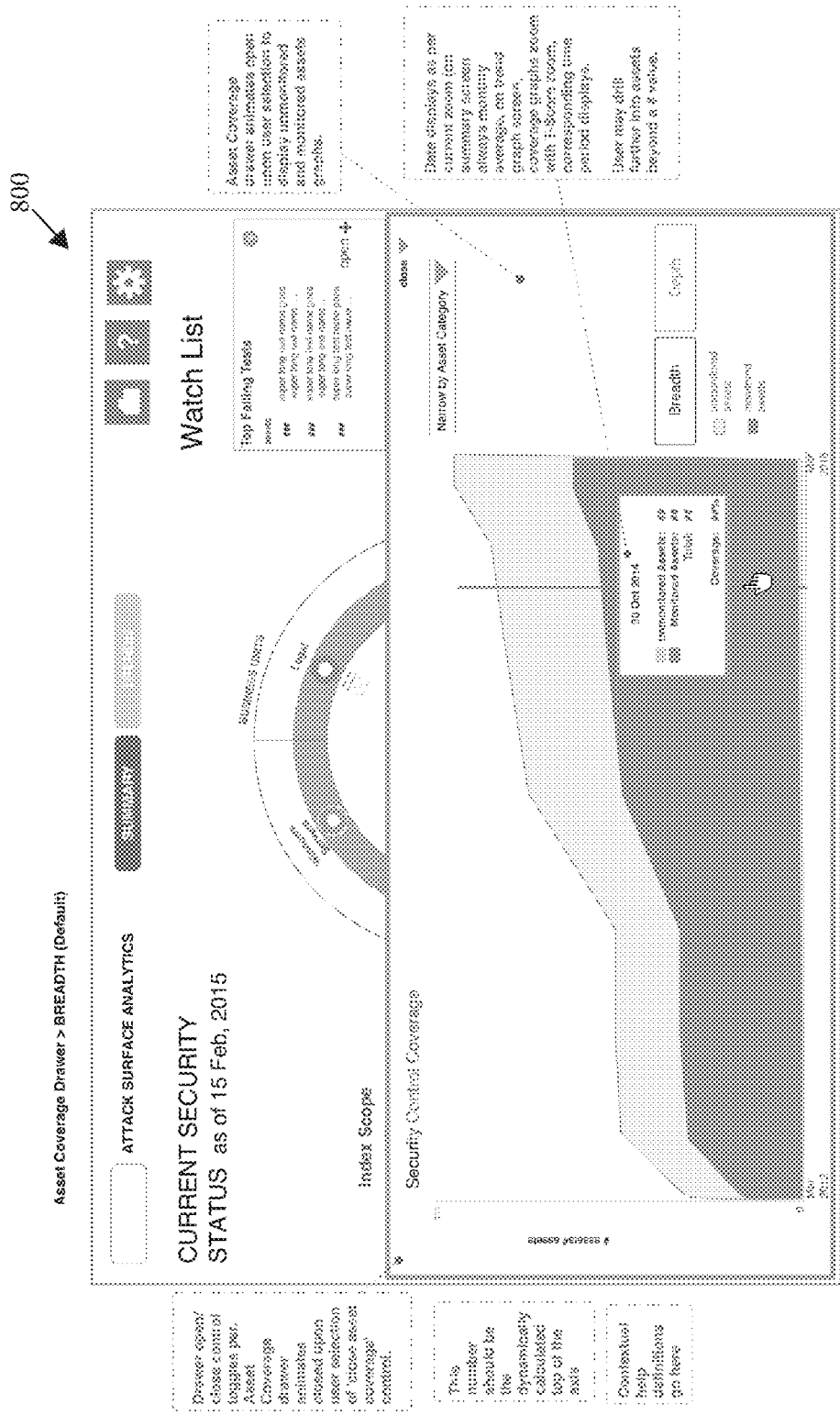
Figure 9:
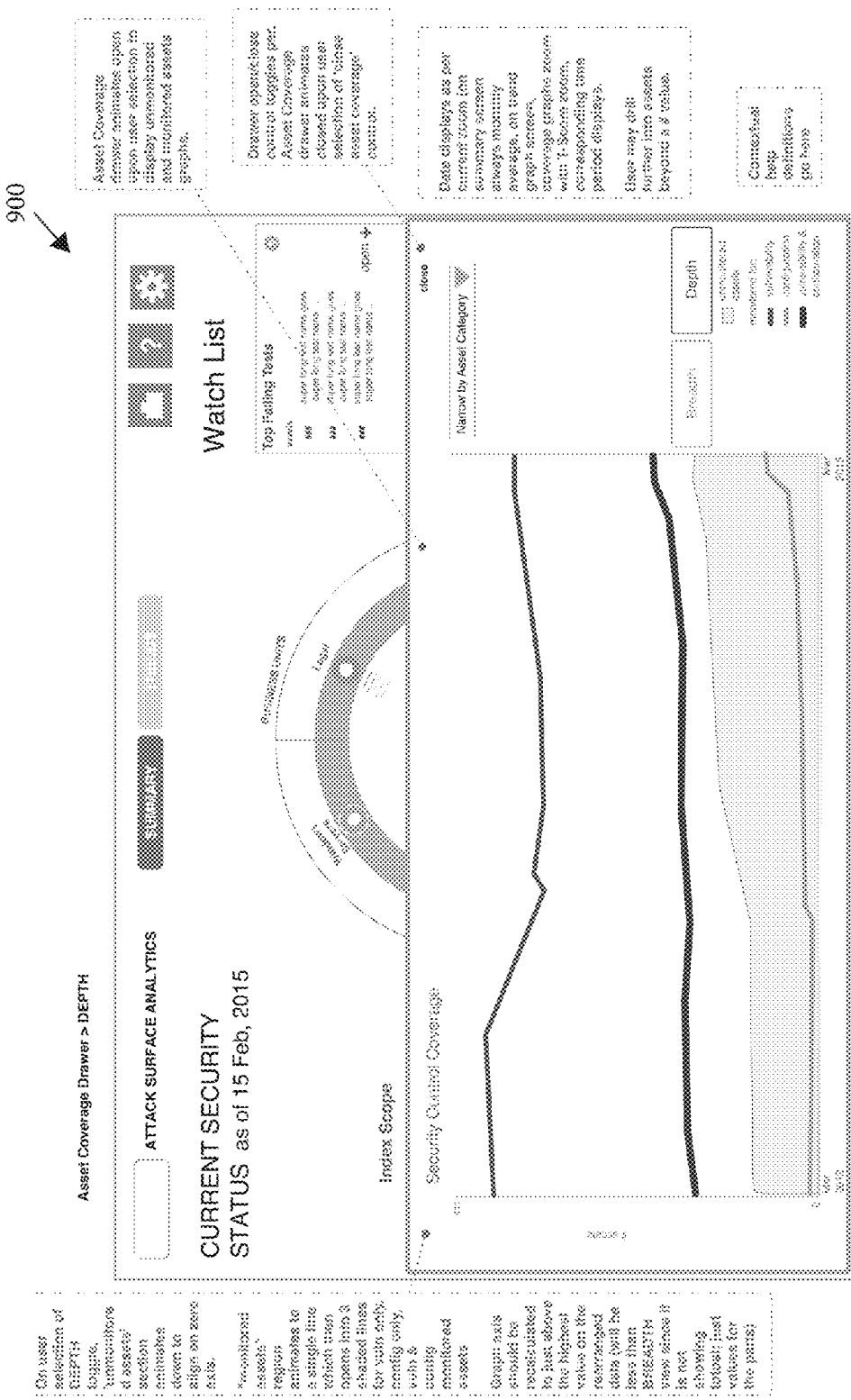
Figure 10:
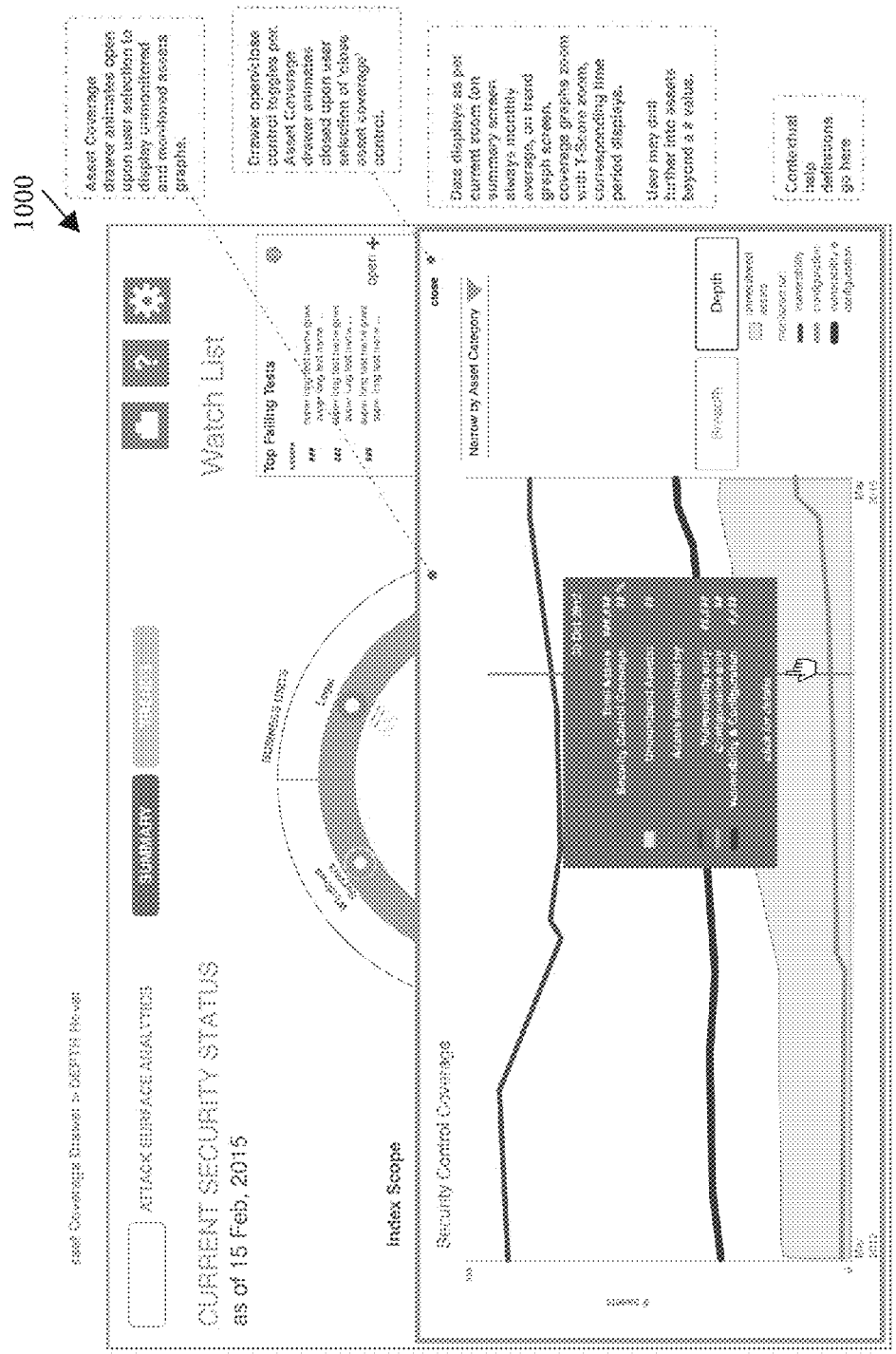
Figure 11:
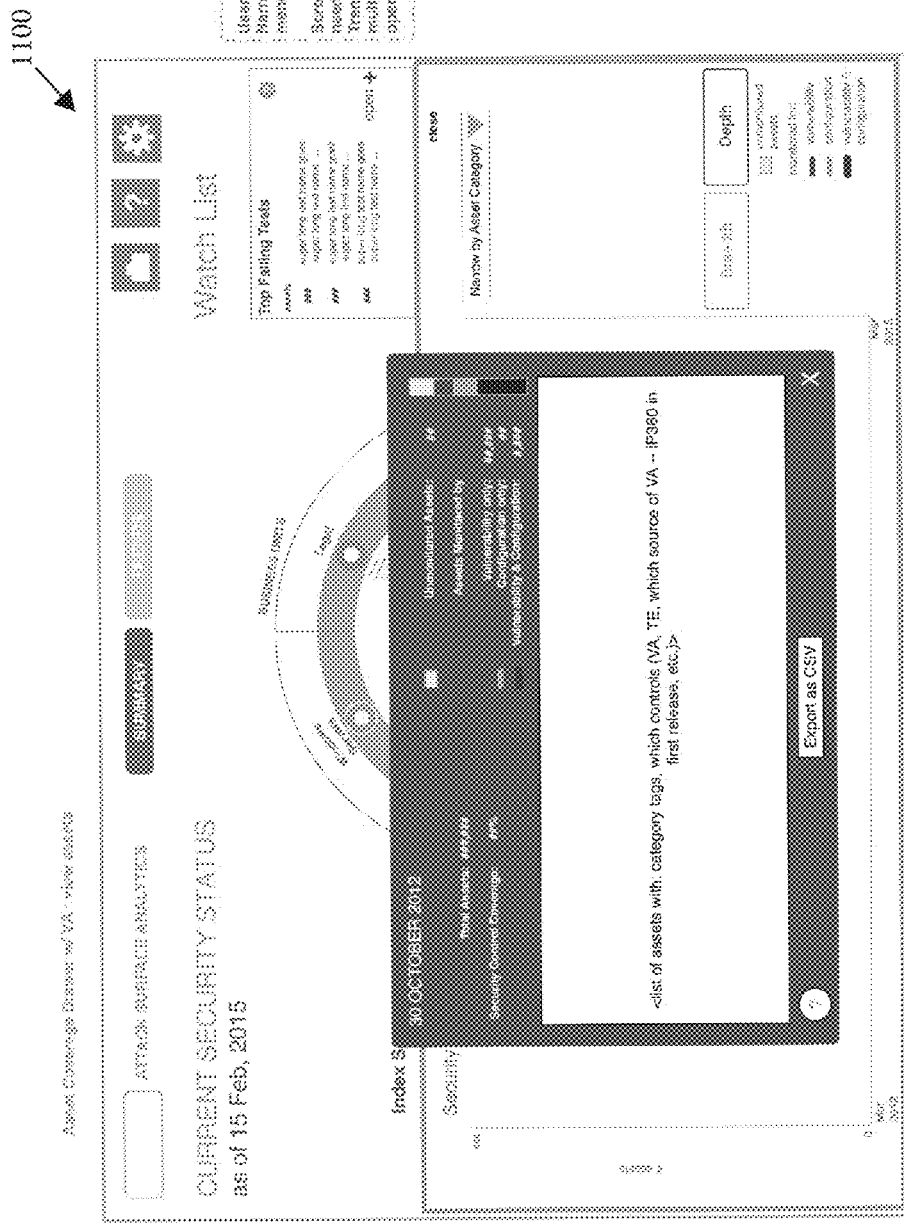
Figure 12:
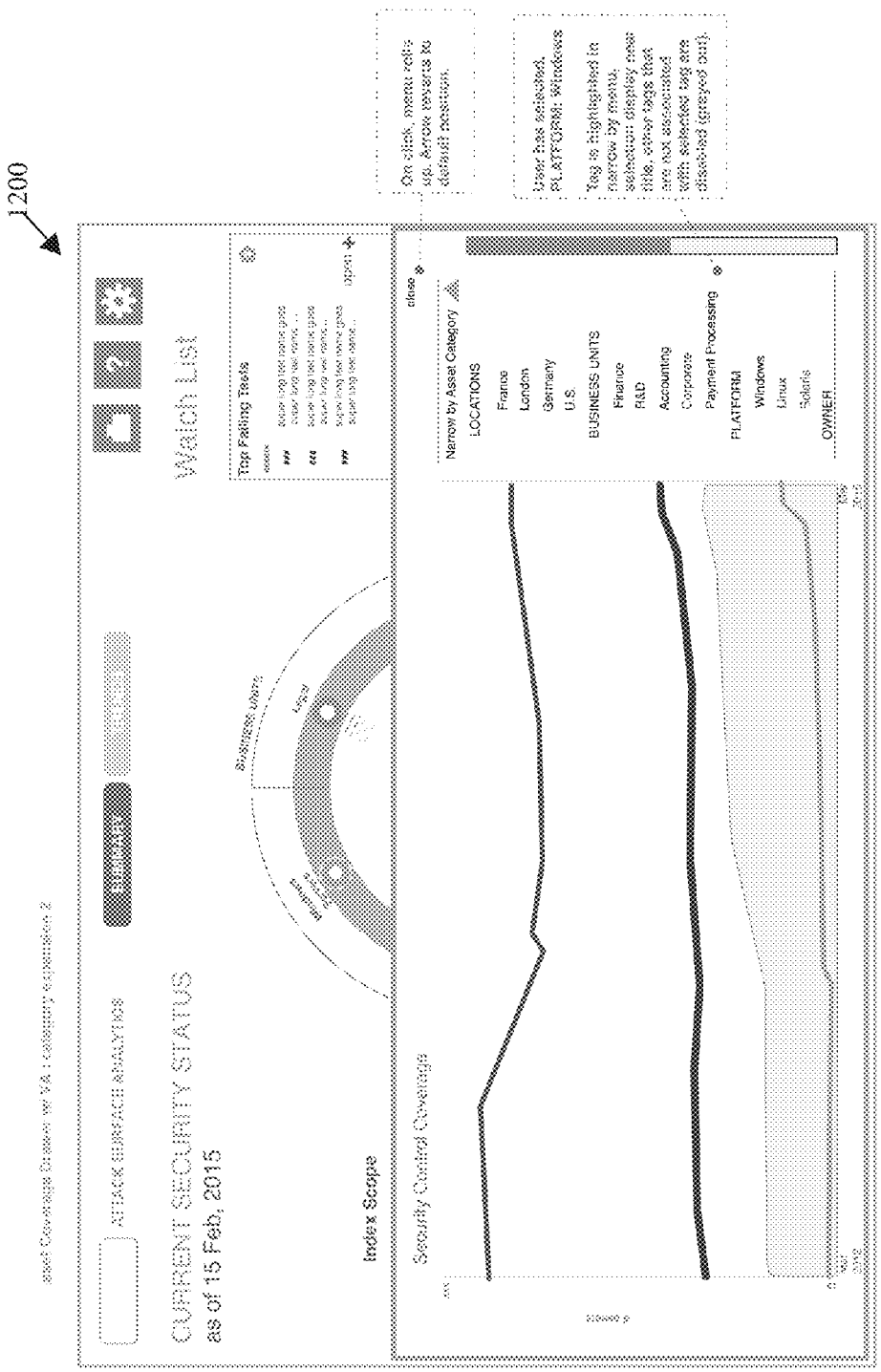
Figure 13:
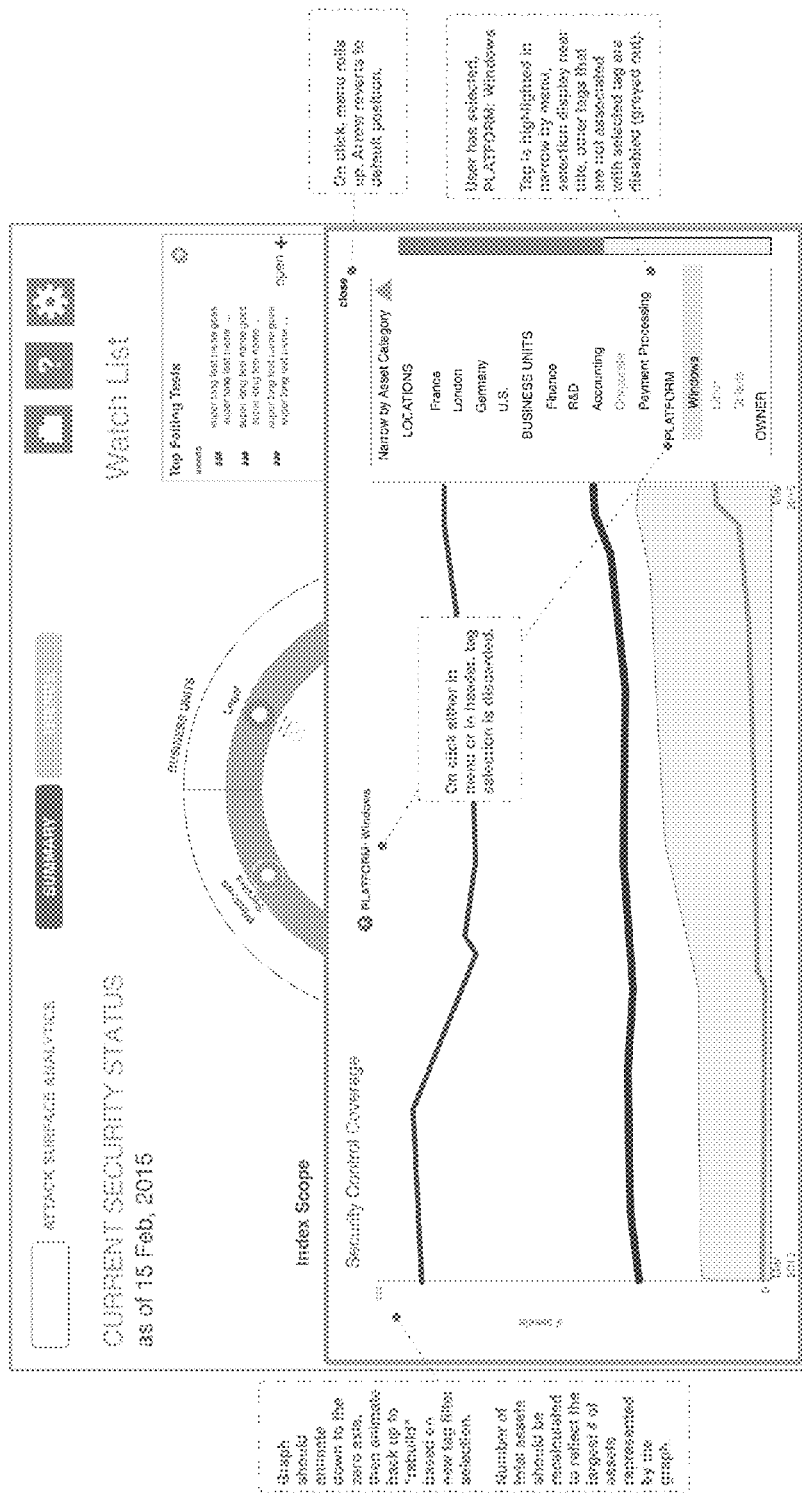
Figure 14:
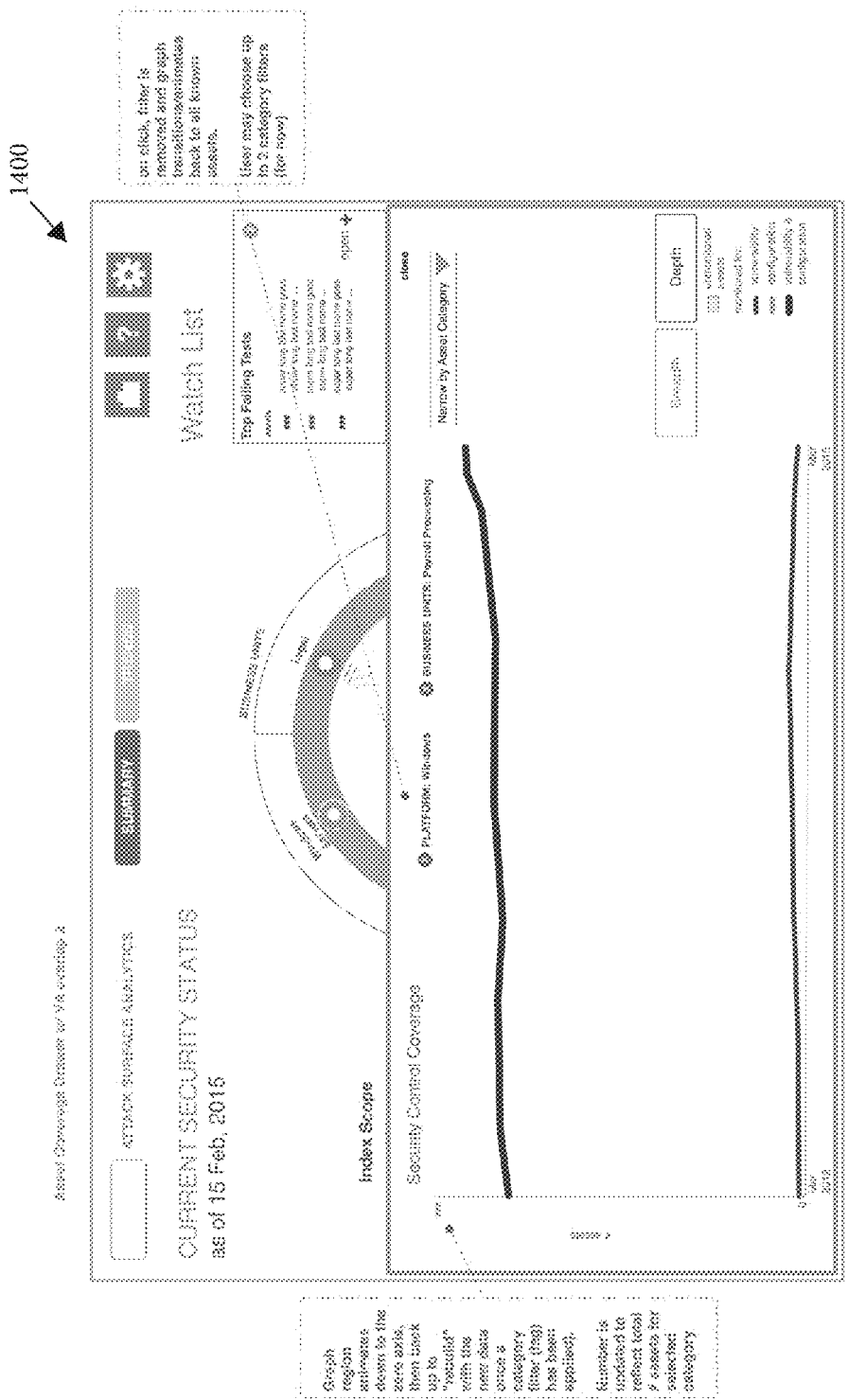

FIG. 6 is an example screen shot of a user interface 600 similar to interface 500 and illustrating a further mechanism for displaying information related to the security and status of one or more of the assets in the IT infrastructure. As with interface 500, the example interface 600 is generally divided into four sections: a vulnerability risk matrix area 510, a compliance test passing percentage area 512, a change data evaluation area 514, and a log event data evaluation area 516.

FIG. 6 illustrates how, in certain embodiments, the user can select an indicator (e.g., by hovering to highlight or by clicking) from any of the areas 510, 512, 514, 516 and receive information about the selected assets in the other respective areas. For instance, as illustrated in FIG. 6, a user has selected an indicator 660 in the compliance test passing percentage area 512 selecting assets that only passed 11%-20% of the HIPAA policy compliance test (as shown by arrow 662). As a result of the user's selection, corresponding information in the other areas 510, 514, 516 is highlighted (as explained above) so that the user can view the vulnerability risk categories (as shown by highlighting 664, 665, 666 in area 510), the one or more change data categories (as shown by highlighting 667 in area 514), and the one or more log event categories (as shown by highlight 668 in area 516) associated with the assets with that particular passing percentage for HIPAA policy compliance. In certain alternative embodiments, when a user selection is made, the corresponding indicators in the areas 510, 512, 514, 516 can display the number of assets only associated with that selection (as opposed to the total number of assets, as illustrated).

A general example of the disclosed technology as shown in FIGS. 5-6 is a method comprising: displaying a user interface that indicates a security control status of assets in an information technology (IT) infrastructure that are monitored by two or more security controls, wherein the user interface includes at least a first portion of the user interface that displays a security control status of a first set of the assets monitored by a first security control, the first portion of the user interface displaying two or more security states monitored by the first security control and further indicating the number of assets in each of the two or more security states monitored by the first security control, the user interface further allowing a user to select one of the two or more security states in the first portion, wherein the user interface further includes at least a second portion of the user interface that displays a security control status of a second set of the assets monitored by a second security control, at least some of the second set of the assets monitored by the second security control overlapping with the first set of the assets monitored by the first security control, the second portion of the user interface displaying two or more security states monitored by the second security control and further indicating the number of assets in each of the two or more security states monitored by the second security control, and wherein, upon user selection of the one of the security states in the portion, one or more of the security states in the second portion having overlapping assets with the selected one of the security states from the first portion are automatically highlighted.

In certain embodiments, the user interface includes one or more additional portions of the user interface for displaying two or more security states monitored by one or more additional respective security controls; and, upon selection of the one of the security states monitored by the first security control, one or more of the security states monitored by the additional respective security controls with overlapping assets with the selected one of the security states monitored by the first security control are automatically highlighted. In some embodiments, the first security control is one of a vulnerability assessment security control, a policy compliance security control, a change data security control, or a log event data security control, and the second security control is different from the first security control and is one of the vulnerability assessment security control, the policy compliance security control, the change data security control, or the log event data security control. In certain embodiments, the first security control is a vulnerability assessment security control, and the first portion of the user interface comprises a two-dimensional vulnerability risk matrix comprising multiple indicators that form the matrix, each indicator indicating the number of assets monitored by the vulnerability assessment security control having the corresponding vulnerability risk represented by the respective indicator. In such embodiments, the second security control can be one of a policy compliance security control, a change data security control, or a log event data security control. In some embodiments, the first security control is a policy compliance security control, and the first portion of the user interface comprises one or more binning diagrams corresponding to policies evaluated by the policy compliance security control. In such embodiments, each of the one or more binning diagrams can be divided into indicators, each indicator representing a percentage range of passing tests in the respective compliance policy for one or more respective assets. Further, the second security control can be a vulnerability assessment security control, a change data security control, or a log event data security control.

Figure 16:
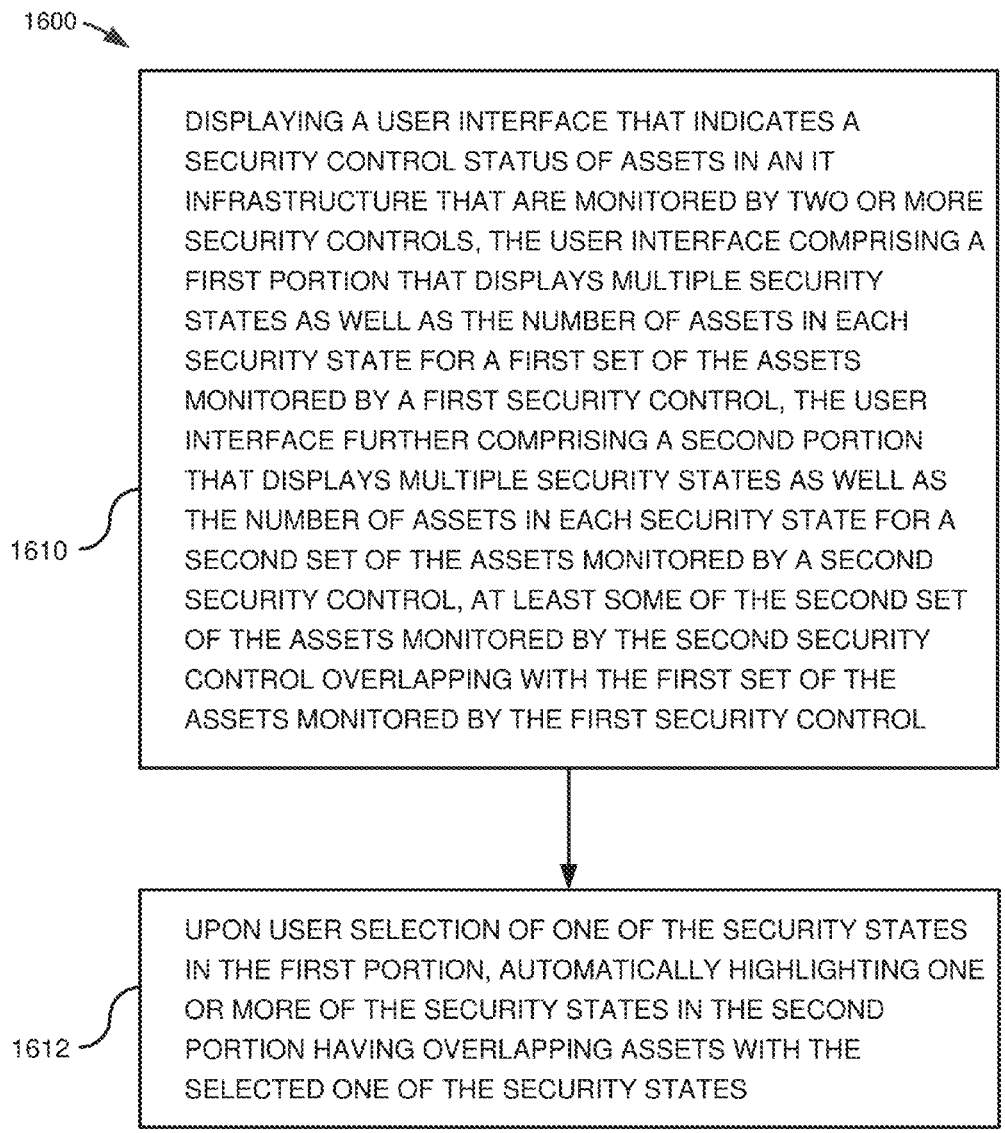
FIG. 16 is a flowchart of an example embodiment of the disclosed technology as illustrated in FIGS. 5-6.

FIG. 16 is a flowchart 1600 of an example embodiment of the disclosed technology as illustrated by FIGS. 5-6 and discussed above. The method shown in FIG. 16 should not be construed as limiting, however, as any one or more of the features and display techniques described can be used in combination with or in place of any of the illustrated features.

At 1610, a user interface is displayed that indicates a security control status of assets in an IT infrastructure that are monitored by two or more security controls, the user interface comprising a first portion that displays multiple security states as well as the number of assets in each security state for a first set of the assets monitored by a first security control, the user interface further comprising a second portion that displays multiple security states as well as the number of assets in each security state for a second set of the assets monitored by a second security control, at least some of the second set of the assets monitored by the second security control overlapping with the first set of the assets monitored by the first security control.

At 1612, upon user selection of one of the security states in the first portion, one or more of the security states in the second portion having overlapping assets with the selected one of the security states are automatically highlighted.

FIGS. 7-14 are a series of example screen shots of other user interfaces 700-1400 for displaying information related to the security and status of one or more of the assets in the IT infrastructure. The example interfaces 700-1400 in FIGS. 7-14 include explanatory text describing the functional features shown therein. Any one or more of the features shown in FIGS. 7-14 can be used in connection with any of the other interfaces shown and described herein, including for example the interfaces in FIGS. 5-7.

Further details for exemplary non-limiting embodiments of the disclosed tools and techniques are shown and described in the specifications and appendices of U.S. Provisional Application No. 61/883,947 entitled "ATTACK SURFACE ANALYTICS" and filed on Sep. 27, 2013, and U.S. Provisional Application No. 61/907,767 entitled "ATTACK SURFACE ANALYTICS" and filed on Nov. 22, 2013, both of which are hereby incorporated herein by reference. Any one or more of the features, aspects, and/or functions described in any of these provisional applications, their appendices, or elsewhere therein can be used alone or in any combination or sub-combination with one another or with any feature, aspect and/or function of the tools and techniques described herein.

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technologies and should not be taken as limiting the scope of the invention.

What is claimed is:

1. One or more non-transitory computer-readable media storing computer-executable instructions which when executed by a computer cause the computer to:
    display a user interface that indicates the number of assets in an information technology (IT) infrastructure that have been discovered by one or more different security controls tools,
    wherein the user interface includes at least a first visual representation corresponding to a first security control and a second visual representation corresponding to a second security control, the first visual representation partially overlapping with the second visual representation and thereby forming a non-overlapping portion of the first visual representation, a non-overlapping portion of the second visual representation, and an overlapping portion of both the first visual representation and the second visual representation, and
    wherein the user interface further displays data in each of the non-overlapping portion of the first visual representation, the non-overlapping portion of the second visual representation, and the overlapping portion of both the first visual representation and the second visual representation,
    the data in the non-overlapping portion of the first visual representation indicating the number of assets in the IT infrastructure that are being monitored by the first security control, the data in the non-overlapping portion of the second visual representation indicating the number of assets in the IT infrastructure that are being monitored by the second security control,
    the data in the overlapping portion of both the first visual representation and the second representation indicating the number of assets in the IT infrastructure that are monitored by both the first security control and the second security control, and
    wherein the user interface further includes a separate visual representation that is separate from the first visual representation and the second visual representation and that displays a number specifying the total number of assets in the IT infrastructure that have been discovered but that are not currently monitored by any of the first security control or the second security control,
    wherein the first visual representation is for one of a vulnerability assessment security control, a policy compliance security control, a change data security control, or a log event data security control, and
    wherein the second visual representation is for a different security control than the first visual representation and is for one of the vulnerability assessment security control, the policy compliance security control, the change data security control, or the log event data security control.

2. The one or more non-transitory computer-readable media of claim 1, wherein the user interface further comprises an asset attribute filtering section displaying one or more attributes of the assets in the IT infrastructure that have been discovered by the one or more different security controls tools, and wherein the method further comprises allowing a user to select or de-select one or more attributes and to thereby filter the data displayed in the first, second, and separate visual representations to display data only for a selected one or more of the attributes.

3. The one or more non-transitory computer-readable media of claim 1, wherein the user interface further comprises a security control filtering section displaying one or more characteristics of the first security control and one or more characteristics of the second security control, and wherein the method further comprises allowing a user to select or de-select one or more characteristics of the first and second security controls and to thereby filter the data displayed in the first, second, and separate visual representations to display data only for a selected one or more of the characteristics.

4. The one or more non-transitory computer-readable media of claim 1, wherein the user interface further comprises a third visual representation corresponding to a third security control, and a fourth visual representation corresponding to a fourth security control,
  wherein the user interface includes an overlapping portion between all of the first visual representation, the second visual representation, the third visual representation, and the fourth visual representation, and
  wherein the data in the overlapping portion between all of the first visual representation, the second visual representation, the third visual representation, and the fourth visual representation indicates the number of assets in the IT infrastructure that are being monitored by all of the first security control, the second security control, the third security control, and the fourth security control.

5. The one or more non-transitory computer-readable media of claim 4, wherein the first visual representation is for a vulnerability assessment security control, the second visual representation is for a policy compliance security control, the third visual representation is for a change data security control, and the fourth visual representation is for a log event data security control.

6. The one or more non-transitory computer-readable media of claim 5, wherein the first visual representation and the second visual representation overlapping with the first visual representation are circular visual representations.

7. The one or more non-transitory computer-readable media of claim 5, wherein the data in at least one of the non-overlapping portion of the first visual representation, the non-overlapping portion of the second visual representation, or the overlapping portion of both the first visual representation and the second representation includes a graph showing a history of the data in the respective portion over a period of time.

8. The method of claim 5, wherein the user interface further comprises an asset attribute filtering section displaying one or more attributes of the assets in the IT infrastructure that have been discovered by the one or more different security controls tools, and wherein the method further comprises allowing a user to select or de-select one or more attributes and to thereby filter the data displayed in the first, second, and separate visual representations to display data only for a selected one or more of the attributes.

9. The method of claim 5, wherein the user interface further comprises a security control filtering section displaying one or more characteristics of the first security control and one or more characteristics of the second security control, and wherein the method further comprises allowing a user to select or de-select one or more characteristics of the first and second security controls and to thereby filter the data displayed in the first, second, and separate visual representations to display data only for a selected one or more of the characteristics.

10. The method of claim 5, wherein the user interface further comprises a third visual representation corresponding to a third security control, and a fourth visual representation corresponding to a fourth security control,
  wherein the user interface includes an overlapping portion between all of the first visual representation, the second visual representation, the third visual representation, and the fourth visual representation, and
  wherein the data in the overlapping portion between all of the first visual representation, the second visual representation, the third visual representation, and the fourth visual representation indicates the number of assets in the IT infrastructure that are being monitored by all of the first security control, the second security control, the third security control, and the fourth security control.

11. A system, comprising:
  a computer processor; and
  a memory, the memory storing instructions which when executed by the processor cause the processor to:
  display a user interface that indicates the number of assets in an information technology (IT) infrastructure that have been discovered by one or more different security controls tools,
  wherein the user interface includes at least a first visual representation corresponding to a first security control and a second visual representation corresponding to a second security control, the first visual representation partially overlapping with the second visual representation and thereby forming a non-overlapping portion of the first visual representation, a non-overlapping portion of the second visual representation, and an overlapping portion of both the first visual representation and the second representation,
  wherein the user interface further displays data in each of the non-overlapping portion of the first visual representation, the non-overlapping portion of the second visual representation, and the overlapping portion of both the first visual representation and the second representation,
  the data in the non-overlapping portion of the first visual representation indicating the number of assets in the IT infrastructure that are being monitored by the first security control,
  the data in the non-overlapping portion of the second visual representation indicating the number of assets in the IT infrastructure that are being monitored by the second security control,
  the data in the overlapping portion of both the first visual representation and the second representation indicating the number of assets in the IT infrastructure that are monitored by both the first security control and the second security control, and
  wherein the user interface further includes a separate visual representation that is separate from the first visual representation and the second visual representation and that displays a number specifying the total number of assets in the IT infrastructure that have been discovered but that are not currently monitored by any of the first security control or the second security control, wherein the user interface further comprises an asset attribute filtering section displaying one or more attributes of the assets in the IT infrastructure that have been discovered by the one or more different security controls tools and a security control filtering section displaying one or more characteristics of the first security control and one or more characteristics of the second security control, and wherein the method further comprises:

allowing a user to select or de-select one or more attributes and to thereby filter the data displayed in the first, second, and separate visual representations to display data only for a selected one or more of the attributes, and allowing the user to select or de-select one or more characteristics of the first and second security controls are selectable or de-selectable and to thereby filter the data displayed in the first, second, and separate visual representations to display data only for a selected one or more characteristics.

12. The system of claim 11, wherein the user interface further comprises a third visual representation corresponding to a third security control and a fourth visual representation corresponding to a fourth security control, wherein the user interface includes an overlapping portion between all of the first visual representation, the second visual representation, the third visual representation, and the fourth visual representation, and wherein the data in the overlapping portion between all of the first visual representation, the second visual representation, the third visual representation, and the fourth visual representation indicates the number of assets in the IT infrastructure that are being monitored by all of the first security control, the second security control, the third security control, and the fourth security control.

13. A method, comprising:

displaying a user interface that indicates the number of assets in an information technology (IT) infrastructure that have been discovered by one or more different security controls tools, wherein the user interface includes at least a first visual representation corresponding to a first security control and a second visual representation corresponding to a second security control, the first visual representation partially overlapping with the second visual representation and thereby forming a non-overlapping portion of the first visual representation, a non-overlapping portion of the second visual representation, and an overlapping portion of both the first visual representation and the second visual representation, and wherein the user interface further displays data in each of the non-overlapping portion of the first visual representation, the non-overlapping portion of the second visual representation, and the overlapping portion of both the first visual representation and the second visual representation, the data in the non-overlapping portion of the first visual representation indicating the number of assets in the IT infrastructure that are being monitored by the first security control, the data in the non-overlapping portion of the second visual representation indicating the number of assets in the IT infrastructure that are being monitored by the second security control, the data in the overlapping portion of both the first visual representation and the second representation indicating the number of assets in the IT infrastructure that are monitored by both the first security control and the second security control, and wherein the user interface further includes a separate visual representation that is separate from the first visual representation and the second visual representation and that displays a number specifying the total number of assets in the IT infrastructure that have been discovered but that are not currently monitored by any of the first security control or the second security control, wherein the first visual representation is for one of a vulnerability assessment security control, a policy compliance security control, a change data security control, or a log event data security control, and wherein the second visual representation is for a different security control than the first visual representation and is for one of the vulnerability assessment security control, the policy compliance security control, the change data security control, or the log event data security control.

14. The method of claim 10, wherein the first visual representation is for a vulnerability assessment security control, the second visual representation is for a policy compliance security control, the third visual representation is for a change data security control, and the fourth visual representation is for a log event data security control.

15. The method of claim 13, wherein the first visual representation and the second visual representation overlapping with the first visual representation are circular visual representations.

16. The method of claim 13, wherein the data in at least one of the non-overlapping portion of the first visual representation, the non-overlapping portion of the second visual representation, or the overlapping portion of both the first visual representation and the second representation includes a graph showing a history of the data in the respective portion over a period of time.

* * * * *